US012613664B2

(12) United States Patent
Imine

(10) Patent No.: US 12,613,664 B2
(45) Date of Patent: Apr. 28, 2026

(54) DATA PROCESSING SYSTEM THAT PERFORMS ACCESS CONTROL OF INFORMATION PROCESSING APPARATUS, INFORMATION PROCESSING APPARATUS, MOBILE COMMUNICATION DEVICE, AND METHOD OF CONTROLLING INFORMATION PROCESSING APPARATUS

(71) Applicant: CANON KABUSHIKI KAISHA, Tokyo (JP)

(72) Inventor: Ryotaro Imine, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 283 days.

(21) Appl. No.: 18/594,190

(22) Filed: Mar. 4, 2024

(65) Prior Publication Data

US 2024/0303016 A1 Sep. 12, 2024

(30) Foreign Application Priority Data

Mar. 10, 2023 (JP) ................................. 2023-037286

(51) Int. Cl.
*G06F 3/12* (2006.01)

(52) U.S. Cl.
CPC .......... *G06F 3/1267* (2013.01); *G06F 3/1222* (2013.01); *G06F 3/1238* (2013.01); *G06F 3/1292* (2013.01)

(58) Field of Classification Search
None
See application file for complete search history.

(56) References Cited

U.S. PATENT DOCUMENTS 11,700,343 B2 * 7/2023 Hosoda ............. H04M 1/72415
                                          358/1.14
2011/0312278 A1 * 12/2011 Matsushita ............. H04W 4/80
                                          455/66.1
2014/0191968 A1 * 7/2014 Hohl ........................ H04W 4/80
                                          345/158
2015/0189025 A1 * 7/2015 Banno ................... G06F 3/1226
                                          709/224

(Continued)

FOREIGN PATENT DOCUMENTS

JP            2016066217 A      4/2016

*Primary Examiner* — Abderrahim Merouan
*Assistant Examiner* — Pawan Dhingra
(74) *Attorney, Agent, or Firm* — ROSSI, KIMMS & McDOWELL LLP

(57) ABSTRACT

Communication setting information for use in UWB communication is exchanged between a mobile terminal and an image forming apparatus by BLE communication. Information for identifying a ranging target is transmitted from the mobile terminal to the image forming apparatus by BLE communication or UWB communication, and the ranging target is identified by the image forming apparatus based on the received information. Ranging is started when the ranging target is identified, and the ranging request data is transmitted to the identified ranging target. The ranging is continued until a measured distance satisfies a first condition, and when the measured distance satisfies the first condition and the ranging is terminated, login authentication is performed on a user having logged in the mobile terminal, for the image forming apparatus.

17 Claims, 26 Drawing Sheets

(56)  References Cited

U.S. PATENT DOCUMENTS

| | | | |
|---|---|---|---|
| 2015/0230056 A1* | 8/2015 | Shin | H04L 12/2818 |
| | | | 455/420 |
| 2017/0188296 A1* | 6/2017 | Fujikami | H04W 8/005 |
| 2017/0208642 A1* | 7/2017 | Sasaki | H04W 76/14 |
| 2018/0276367 A1* | 9/2018 | Benson | H04W 12/068 |
| 2019/0239259 A1* | 8/2019 | Kunimatsu | G06F 3/1226 |
| 2020/0120458 A1* | 4/2020 | Aldana | H04W 28/22 |
| 2021/0127246 A1* | 4/2021 | Lee | H04W 12/55 |
| 2022/0060601 A1* | 2/2022 | Hosoda | H04N 1/32791 |
| 2023/0100233 A1* | 3/2023 | Koizumi | H04L 67/52 |
| | | | 358/1.13 |
| 2024/0303006 A1* | 9/2024 | Fukui | G06F 3/1222 |
| 2025/0212266 A1* | 6/2025 | Morimoto | H04W 48/16 |

* cited by examiner

PRINT

UWB ACCESS CONTROL SETTINGS

AUTHENTICATION DISTANCE SETTING

1111

50 cm

MFP PRIORITY ⎯⬤ TERMINAL PRIORITY   1112

COMBINATION WITH OTHER LOGIN METHODS

IC CARD    AND ⬤ OR    1113

KEYBOARD INPUT    AND ⬤ OR    1114  1113

SETTINGS    POWER SAVING ( )  (1) (2) (3)
(4) (5) (6)
(7) (8) (9)
(*) (0) (#)
(ID) (C)

RESET  [ / ]

STOP  ▷

START  ◇

1120

PRINT

UWB ACCESS CONTROL SETTINGS

OFF    ON

RANGING START
CONDITION SETTINGS

JOB RECEPTION    1121

MOTION DETECTION    1122

RANGING TERMINATING
CONDITION SETTINGS

LOGOUT    1123

DISTANCE SETTING    1124

MOTION DETECTION    1125

SETTINGS    POWER
SAVING ( )  (1)  (2)  (3)

(4)  (5)  (6)

(7)  (8)  (9)

(*)  (0)  (#)

(ID)  (C)

RESET    STOP

START

FIG. 12

USER ACCOUNT LIST

| User_name | Pass_word | IC_card | Mail_address | UWB_Tag1 | UWB_tag2 | UWB_tag3 |
|---|---|---|---|---|---|---|
| shimizu | password1 | 4ab41189ff450011 | shimizu.k@mail.xxxx | 03CF145B | | |
| suzuki | password2 | 4ab41189ff450012 | suzuki@mail.xxxx | 00AAC045 | 00AAC123 | 00AAFC12 |
| kato | password3 | 4ab41189ff450013 | kato@mail.xxxx | | | |
| takahashi | password4 | 4ab41189ff450014 | takahashi@mail.xxx | | | |

*FIG. 13*

JOB MANAGEMENT INFORMATION LIST

| JOBID | JOB_type | JOB_Status | Date | User_name | terminal | TAG_panid | TAG_addr | Rang_set(x) | Rang_Value |
|-------|----------|------------|------|-----------|----------|-----------|----------|-------------|------------|
| • • • | | | | | | | | | |
| 234 | PRINT | Complete | 20220108 | shimizu | mobile | 03CF | 145Br | 2 | - |
| • • • | | | | | | | | | |
| 12348 | PRINT | Ranging | 20220505 | suzuki | mobile | 00AA | C045 | 2 | 11.3 |
| • • • | | | | | | | | | |

DATA PROCESSING SYSTEM THAT PERFORMS ACCESS CONTROL OF INFORMATION PROCESSING APPARATUS, INFORMATION PROCESSING APPARATUS, MOBILE COMMUNICATION DEVICE, AND METHOD OF CONTROLLING INFORMATION PROCESSING APPARATUS

BACKGROUND OF THE INVENTION

Field of the Invention

The present invention relates to a data processing system, an information processing apparatus, a mobile communication device, and a method of controlling the information processing apparatus, and more particularly to a data processing system that transmits data from a mobile communication device to an information processing apparatus by using wireless communication, an information processing apparatus, a mobile communication device, and a method of controlling the information processing apparatus.

Description of the Related Art

In recent years, there is known a data processing system that enables a user to receive a service of an information processing apparatus only by approaching the information processing apparatus while holding a portable information device (mobile communication device), such as a mobile terminal, and reduces a waiting time required to perform user authentication. In this system, first, the mobile terminal receives a Bluetooth advertising packet transmitted from the information processing apparatus and calculates a distance based on the radio wave intensity. Next, the mobile terminal compares this distance with a predetermined value, and if a condition is satisfied, the mobile terminal receives information for receiving the above-mentioned service from the information processing apparatus, transmits a login request to the information processing apparatus, and starts a login process. Further, in this login process, the user can interactively perform confirmation and operation on the operation screen of the mobile terminal (see, for example, Japanese Laid-Open Patent Publication (Kokai) No. 2016-66217).

Thus, in Japanese Laid-Open Patent Publication (Kokai) No. 2016-66217, only by approaching a target apparatus, an application installed in the mobile terminal is capable of performing login processing based on a distance from the target apparatus to receive a service. The technique disclosed in Japanese Laid-Open Patent Publication (Kokai) No. 2016-66217 is, generally, an example of applying an access control technique for performing control according to a distance and is a prior art invention considering the convenience of a user.

However, according to the technique disclosed in Japanese Laid-Open Patent Publication (Kokai) No. 2016-66217, an application that performs access control by using Bluetooth is installed in a mobile terminal and a user can interactively perform operation and confirmation on the operation screen. Therefore, a use case is envisaged in which the user is required to gaze and operate on the operation screen in a process of moving toward a target apparatus.

SUMMARY OF THE INVENTION

The present invention provides a data processing system that is capable of performing access control of an information processing apparatus without requiring a user having a mobile communication device to gaze or operate on a screen, an information processing apparatus, a mobile communication device, a control method, and a storage medium.

In a first aspect of the present invention, there is provided a data processing system including a mobile communication device and an information processing apparatus that can communicate with each other by first wireless communication and second wireless communication, including an exchange unit configured to exchange communication setting information for use in the second wireless communication between the mobile communication device and the information processing apparatus by the first wireless communication, a ranging unit configured to transmit, as an execution entity of ranging in a bidirectional ranging method of the second wireless communication, ranging request data from the information processing apparatus to a ranging target that performs the second wireless communication, and receive, at the information processing apparatus, ranging response data associated with the ranging request data from the ranging target, to thereby measure a distance between the ranging target and the information processing apparatus, a transmission unit configured to transmit information for identifying the ranging target from the mobile communication device to the information processing apparatus by the first wireless communication or the second wireless communication based on the communication setting information exchanged by the exchange unit, an identification unit configured to identify the ranging target at the information processing apparatus based on the information for identifying the ranging target, a ranging start unit configured to start, when the ranging target is identified by the identification unit, ranging by the ranging unit, and transmit the ranging request data to the ranging target identified by the identification unit, and a continuous execution unit configured to continue execution of the ranging started by the ranging start unit until a distance measured by the ranging unit satisfies a first condition, wherein in a case where the distance measured by the ranging unit satisfies the first condition, and the continuous execution of the ranging is terminated, account control on a user having logged in the mobile communication device is performed for the information processing apparatus.

In a second aspect of the present invention, there is provided an information processing apparatus that is capable of communicating with a mobile communication device by first wireless communication and second wireless communication, including an exchange unit configured to exchange communication setting information for use in the second wireless communication with the mobile communication device, by the first wireless communication, a ranging unit configured to transmit, as an execution entity of ranging in a bidirectional ranging method of the second wireless communication, ranging request data to a ranging target that performs the second wireless communication, and receive ranging response data associated with the ranging request data from the ranging target, to thereby measure a distance between the ranging target and the information processing apparatus, an acquisition unit configured to acquire information for identifying the ranging target from the mobile communication device by the first wireless communication or the second wireless communication based on the communication setting information exchanged by the exchange unit, an identification unit configured to identify the ranging target based on the information for identifying the ranging target, a ranging start unit configured to start, when the ranging target is identified by the identification unit, the ranging by the ranging unit, and transmit the ranging request data to the ranging target identified by the identification unit, and a continuous execution unit configured to continue execution of the ranging started by the ranging start unit until a distance measured by the ranging unit satisfies a first condition, wherein in a case where the distance measured by the ranging unit satisfies the first condition, and the continuous execution of the ranging is terminated, account control on a user is performed for the information processing apparatus.

In a third aspect of the present invention, there is provided a mobile communication device that is capable of communicating with an information processing apparatus by first wireless communication and second wireless communication, the information processing apparatus including a ranging unit configured to transmit, as an execution entity of ranging in a bidirectional ranging method of the second wireless communication, ranging request data to a ranging target that performs the second wireless communication, and receive ranging response data associated with the ranging request data from the ranging target, to thereby measure a distance between the ranging target and the information processing apparatus, the mobile communication device including an exchange unit configured to exchange communication setting information for use in the second wireless communication, with the information processing apparatus, by the first wireless communication, and a transmission unit configured to transmit information for identifying the ranging target to the information processing apparatus by the first wireless communication or the second wireless communication based on the communication setting information exchanged by the exchange unit.

According to the present invention, it is possible to perform access control of an information processing apparatus without requiring a user having a mobile communication device to gaze or operate on a screen.

Further features of the present invention will become apparent from the following description of exemplary embodiments (with reference to the attached drawings).

BRIEF DESCRIPTION OF THE DRAWINGS

FIG. 9A is a diagram showing a structure of a BLE advertising packet transmitted from each image forming apparatus, appearing in FIG. 1, which is equipped with a UWB communication function.

FIG. 12 is a diagram showing a table of a user account list.

FIG. 13 is a diagram showing a table of a job management information list.

DESCRIPTION OF THE EMBODIMENTS

The present invention will now be described in detail below with reference to the accompanying drawings showing embodiments thereof. Although an image forming apparatus is described as an example of an information processing apparatus in the present embodiments, the present invention is not limited to the embodiments described below, and all combinations of features described in the embodiments are not absolutely essential to the solution of the present invention.

The present invention is characterized in that when data is transmitted from a mobile communication device to an information processing apparatus, the information processing apparatus performs ranging (distance measurement) between a ranging target whose information is added to the transmitted data and the mobile communication device on its own initiative. With this, it is possible to determine whether or not a user has approached the information processing apparatus without requiring the user to perform a troublesome operation on the mobile communication device held by the user.

Further, the present invention is characterized in an access control method that completes ranging and authentication processing on the information processing apparatus based on a result of ranging. This makes it possible to execute a job in the information processing apparatus based on data transmitted from the mobile communication device.

Hereafter, a first embodiment will be described in detail with reference to drawings.

Figure 1:
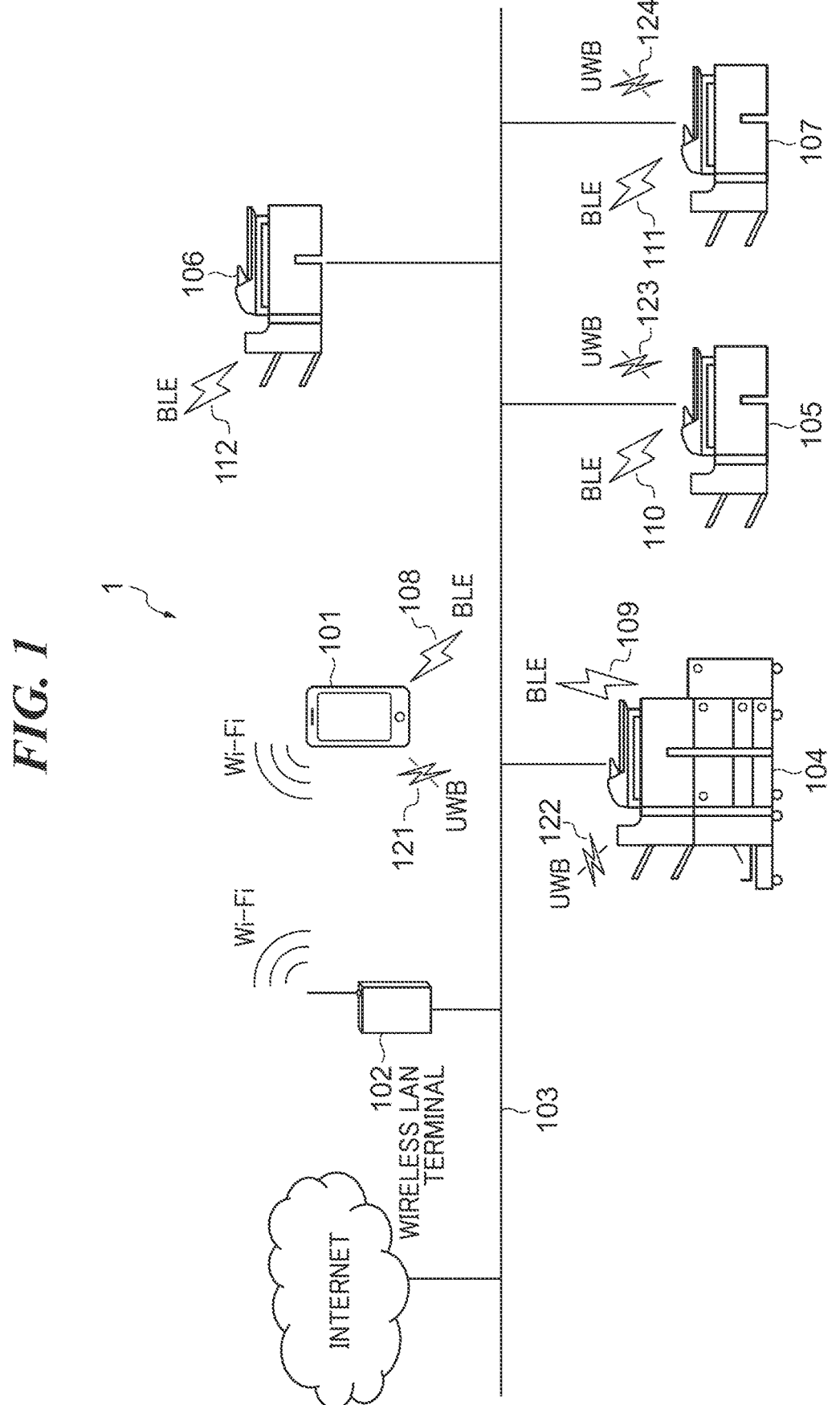
FIG. 1 is a diagram showing a configuration of a data processing system according to a first embodiment of the present invention.

FIG. 1 is a diagram showing a configuration of a data processing system 1 according to the first embodiment of the present invention.

Referring to FIG. 1, the data processing system 1 includes a mobile terminal 101, a wireless Local Area Network (LAN) terminal 102, a LAN 103, and image forming apparatuses 104 to 107.

The mobile terminal 101 (mobile communication device) transmits a print job to one of the image forming apparatuses 104 to 107 by using Ultra Wideband (UWB) communication. The image forming apparatuses 104 to 107 can be equipped with not only a printer function and a wireless communication function, but also, for example, a copy function, a scanner function, and a fax transmission function.

The LAN 103 connects between, for example, the mobile terminal 101 and the image forming apparatuses 104 to 107 by wired connection, and the apparatuses connected by wired connection in the data processing system 1 exchange information by intercommunication via the LAN 103. Further, the LAN 103 is also connected to the Internet.

The wireless LAN terminal 102 is a parent device of a wireless LAN having a general network router function and provides the wireless LAN via Wi-Fi in a home, an office, or the like. Further, note that the mobile terminal 101 is connected to the LAN 103 via the wireless LAN terminal 102 by enabling the Wi-Fi function thereof. When the mobile terminal 101 enters a wireless LAN area provided by the wireless LAN terminal 102, the mobile terminal 101 can automatically participate in the network of the LAN 103 by using authentication information set in advance.

Signals 108 to 112 are radio signals using Bluetooth Low Energy (BLE) (first wireless communication) transmitted and received by the mobile terminal 101 and the image forming apparatuses 104 to 107. A wireless personal area network (WPAN) can be formed between the apparatuses located within reach of the signals 108 to 112.

Signals 121 to 124 are radio signals using UWB (second wireless communication) transmitted and received by the mobile terminal 101 and the image forming apparatuses 104, 105, and 107 (information processing apparatuses). A WPAN can be formed between the apparatuses located within reach of the signals 121 to 124 for mutual communication. Note that the image forming apparatus 106 is an apparatus which is not equipped with the UWB communication function. Further, the image forming apparatus 107 and the mobile terminal 101 are sufficiently spaced from each other, and the mobile terminal 101 cannot receive the UWB radio wave (signal 124) from the image forming apparatus 107.

The data processing system 1 is characterized in that it is possible to perform determination of whether or not a user has approached one of the image forming apparatuses 104, 105, and 107 without requiring the user to perform confirmation and operation on a screen of the mobile terminal 101 held (carried) by the user. Further, the data processing system 1 is also characterized in control (hereinafter referred to as the access control) for causing one of the image forming apparatuses 104, 105, and 107, which has been determined to be approached by the user, to complete authentication processing. Hereafter, the apparatus configuration and the method of realizing these characteristics will be described with reference to the drawings.

Figure 2:
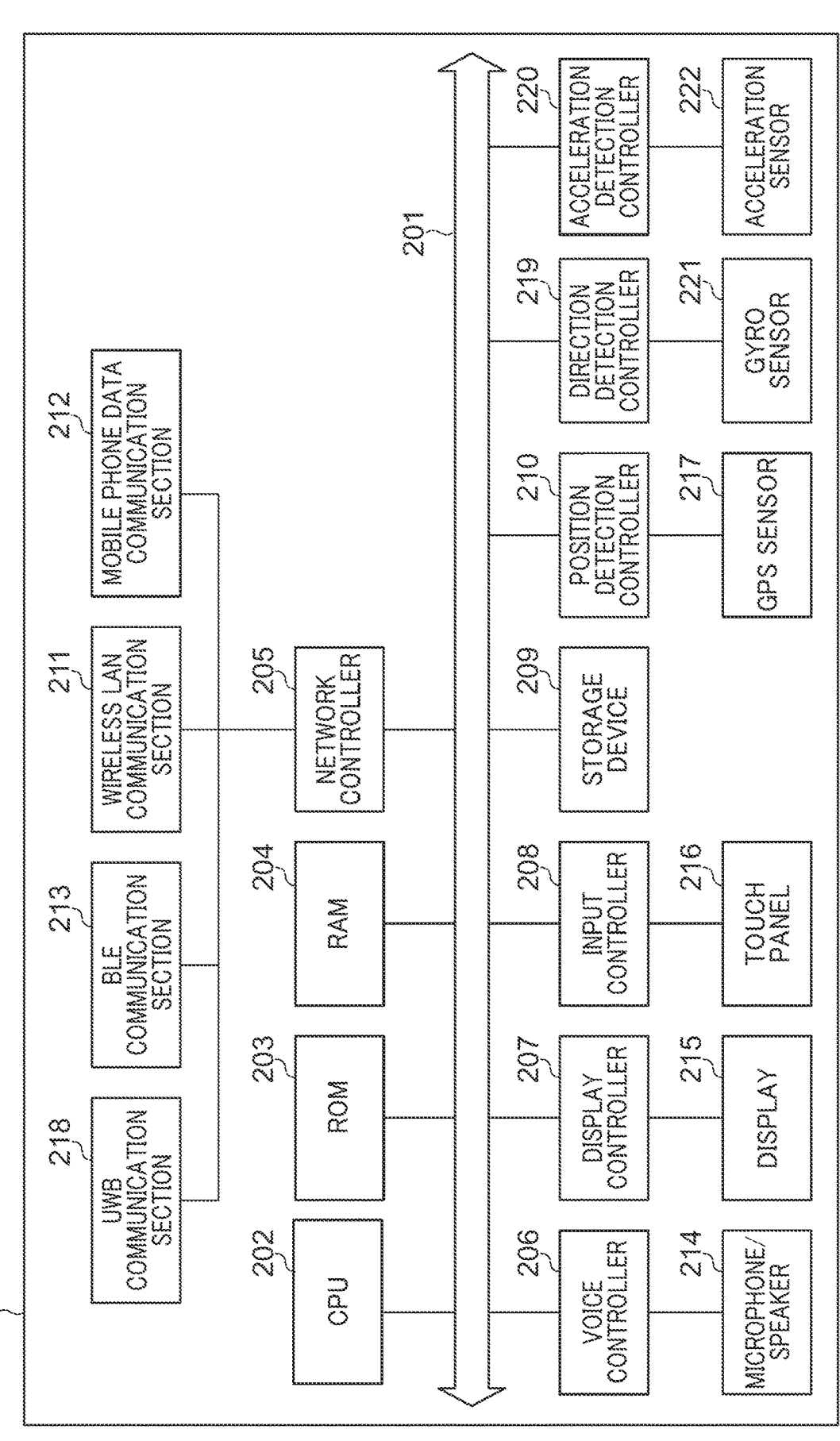
FIG. 2 is a block diagram showing a hardware configuration of a mobile terminal appearing in FIG. 1.

FIG. 2 is a block diagram showing a hardware configuration of the mobile terminal 101 appearing in FIG. 1.

The mobile terminal 101 is a terminal which can be carried by a user, such as a smartphone and a tablet, and on which an operating system (OS) therefor and programs for controlling speech communication and data communication can operate. Note that the mobile terminal 101 can be an apparatus which is not equipped with a microphone/speaker 214, a GPS sensor 217, a gyro sensor 221, an acceleration sensor 222, controllers (206, 210, 219, and 220) for controlling these components, a mobile phone data communication section 212, and so forth, described hereinafter. Examples of the apparatus include a portable personal computer, such as a laptop-type personal computer.

The hardware components are directly or indirectly connected to a system bus 201.

Referring to FIG. 2, the mobile terminal 101 includes a central processing unit (CPU) 202, a read only memory (ROM) 203, a random access memory (RAM) 204, a network controller 205, a voice controller 206, a display controller 207, an input controller 208, a storage device 209, a position detection controller 210, and a wireless LAN communication section 211. Further, the mobile terminal 101 includes the mobile phone data communication section 212, a BLE communication section 213, the microphone/speaker 214, a display 215, a touch panel 216, the GPS sensor 217, a UWB communication section 218, and a direction detection controller 119. Further, the mobile terminal 101 includes an acceleration detection controller 220, the gyro sensor 221, and the acceleration sensor 222.

The ROM 203 stores the OS of the mobile terminal 101 and the applications for controlling speech communication and data communication, which are executed by the CPU 202. The applications for controlling data communication include not only a print application 401, described hereinafter with reference to FIG. 4, but also mail software, not shown, and so forth.

The RAM 204 is a memory for executing a program and is a work memory area used by an application to execute a program. Further, the RAM 204 is also used to temporarily store data required to be temporarily stored when an application executes a program, and the like.

The storage device 209 is a nonvolatile storage device storing a variety of operation mode settings required to be held even after the restart of the mobile terminal 10, an operation log, and so forth.

The network controller 205 controls communication performed by the wireless LAN communication section 211, the mobile phone data communication section 212, the BLE communication section 213, and the UWB communication section 218. Here, the wireless LAN communication section 211 is a communication section that participates in the network of the LAN 103 via the wireless LAN terminal 102, and the mobile phone data communication section 212 is a communication section for participating in a network provided by a mobile phone carrier. The BLE communication section 213 is a communication section for forming a WPAN between peripheral computer devices located within reach of BLE wireless signals for mutual communication. Further, the UWB communication section 218 is a communication section for forming a WPAN in which ranging and data communication are performed between peripheral computer devices located within reach of UWB wireless signals for mutual communication.

Here, when the mobile terminal 101 can participate in the network of the wireless LAN, the network controller 205 gives the priority to connection of the wireless LAN. In a case where the mobile terminal 101 has moved to the outside of the network area of the wireless LAN, exclusive control for causing the mobile terminal 101 to participate in a wireless communication network provided by the mobile phone carrier is performed, but in the BLE communication and the UWB communication, the communication function is independently controlled so as to achieve the purpose of the communication.

The voice controller 206 is used, for example, when a speech application is started and the user is calling. Specifically, when voice data is input and output to and from the microphone/speaker 214, the voice controller 206 mediates the voice data and a voice data control program.

The display controller 207 controls information output on the display 215 of the mobile terminal 101.

The input controller 208 controls information designated by a user using a button (not shown) provided on the mobile terminal 101 or the touch panel 216.

The applications operating on the mobile terminal 101 provide network communication information and a variety of information of the mobile terminal 101 to a user by using the voice controller 206, the display controller 207, and the input controller 208.

The position detection controller 210 acquires positional information of the mobile terminal 101 from the GPS sensor 217 and provides the acquired information to the OS.

The direction detection controller 219 acquires direction information of the mobile terminal 101 from the gyro sensor 221 and provides the acquired information to the OS.

The acceleration detection controller 220 acquires acceleration information of the mobile terminal 101 from the acceleration sensor 222 and provides the acquired information to the OS. The above-described controls of the controllers 205 to 210, 219, and 220 are controlled by the OS operating on the CPU 202.

The mobile terminal 101 is capable of performing ranging communication for measuring a distance from each of the image forming apparatuses 104, 105, and 107 via the UWB communication section 218. The UWB communication section 218 at least supports Two Way Ranging (TWR) shown in FIG. 6 as a method of ranging communication. The mobile terminal 101 transmits ranging request data and receives corresponding ranging response data via this UWB communication section 218. The mobile terminal 101 is capable of providing distance information generated by the CPU 202 performing distance calculation by data processing, at a request timing expected by the application. Thus, the mobile terminal 101 can provide information on a distance not only from each of the image forming apparatuses 104, 105, and 107 in the system configuration shown in FIG. 1, but also from each of peripheral devices, not shown, supporting UWB communication.

Further, in a case where a request for distance measurement is sent from any of the image forming apparatuses 104, 105, and 107, or from any of the other peripheral devices, the mobile terminal 101 can also cope with the request. In this case, the mobile terminal 101 can transmit ranging response data in response to reception of the ranging request data by TWR as the method of ranging communication.

Figure 3:
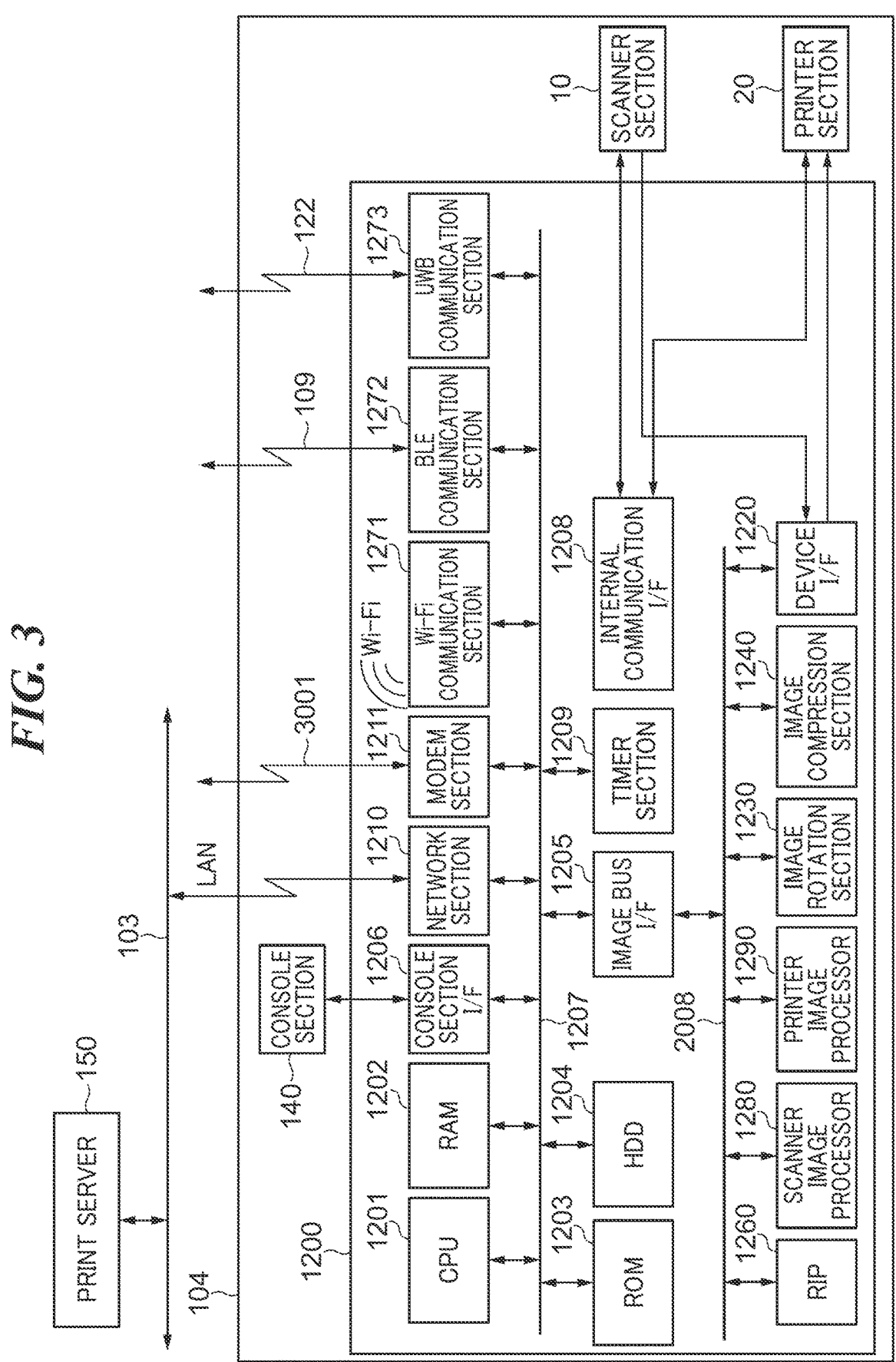
FIG. 3 is a block diagram showing a hardware configuration of an image forming apparatus appearing in FIG. 1.

FIG. 3 is a block diagram showing a hardware configuration of the image forming apparatus 104 appearing in FIG. 1. Note that the image forming apparatuses 105 and 107 have the same configuration, and hence description thereof is omitted.

The image forming apparatus 104 includes a console section 140 used by a user to perform a variety of operations, a scanner section 10 that reads image information according to an instruction from the console section 140, a printer section 20 that prints image data on a sheet, and a controller 1200.

The scanner section 10 has a CPU that controls the scanner section 10, and an illumination lamp, a scanning mirror, and so forth, not shown, for reading an original.

The printer section 20 has a CPU that controls the printer section 20, and photosensitive drums and a fixing device, not shown, for forming an image and fixing the image.

The controller 1200 controls the scanner section 10, the printer section 20, and the console section 140, and performs centralized control of communication with external information devices, including the mobile terminal 101 and a print server 150, connected, for example, via the LAN 103 and the wireless LAN.

The internal components of the controller 1200 will be described in detail with reference to FIG. 3.

The controller 1200 includes a Wi-Fi communication section 1271, a BLE communication section 1272, and a UWB communication section 1273, which can perform wireless communication with the external mobile terminal 101. These are connected to a system bus 1207, referred to hereinafter.

Further, the controller 1200 has a raster image processor (RIP) 1260 that rasterizes a PDL code included in a print job received from the mobile terminal 101 via wireless communication into a bitmap image.

Further, the controller 1200 has a scanner image processor 1280 that performs correction, processing, and editing on image data input from the scanner section 10.

Further, the controller 1200 has a printer image processor 1290 that performs correction, resolution conversion, and the like, on image data to be output (printed) by the printer section 20, and an image rotation section 1230 that rotates image data.

Further, the controller 1200 has an image compression section 1240 that performs compression/expansion processing on multi-value image data according to the Joint Photographic Experts Group (JPEG) and performs compression/expansion processing on binary image data according to the Joint Bi-level Image Experts Group (JBIG), Modified Modified Read (MMR), or Modified Huffman (MH).

Further, the controller 1200 has a device interface 1220 that connects between the scanner section 10 and the printer section 20, and the controller 1200 to perform synchronous/asynchronous conversion of image data.

Further, the controller 1200 has an image bus 2008 that interconnects between the RIP 1260, the scanner image processor 1280, the printer image processor 1290, the image rotation section 1230, the image compression section 1240, and the device interface 1220, so as to transfer image data at high speed.

Further, the controller 1200 has a CPU 1201 as a controller that performs centralized control of the image forming apparatus 104.

Further, the controller 1200 has a RAM 1202 that functions as a system work memory for the operation of the CPU 1201 and also functions as an image memory for temporarily storing image data.

Further, the controller 1200 has the console section 140 and a console section interface 1206. Image data to be displayed on the console section 140 is output to the console section 140 via the console section interface 1206. Further, the console section interface 1206 plays a role of transferring information input by a user using the image forming apparatus 104 from the console section 140 to the CPU 1201.

Further, the controller 1200 has a network section 1210 that is connected to the LAN 103 and performs data communication with (data transmission and reception to and from) the print server 150 and other computer terminals, not shown, on the LAN 103.

Further, the controller 1200 has a modem section 1211 that is connected to a public line 3001 and performs data communication with (data transmission and reception to and from) an external facsimile device, not shown.

Further, the controller 1200 includes a ROM 1203 that stores a boot program executed by the CPU 1201 and a hard disk drive (HDD) 1204 that stores system software, image data, software counter values, and so forth.

Further, the controller 1200 has an internal communication interface 1208 that performs communication with the scanner section 10 and the printer section 20, and a timer section 1209 used for measuring time when ranging using UWB, described hereinafter, is performed.

Further, the controller 1200 includes the system bus 1207. The system bus 1207 interconnects between the CPU 1201, the RAM 1202, the console section interface 1206, the timer section 1209, the network section 1210, the modem section 1211, the ROM 1203, the HDD 1204, and the internal communication interface 1208.

The controller 1200 includes an image bus interface 1205 that functions as a bus bridge for connecting between the system bus 1207 and the image bus 1212 and converting the data structure.

The controller 1200 records and manages job execution history, including a user name, the number of copies, color print settings, output attribute information, and so forth, at the time of execution of a print job or a copy job, in the HDD 1204 or the RAM 1202, as job log information.

Figure 4:
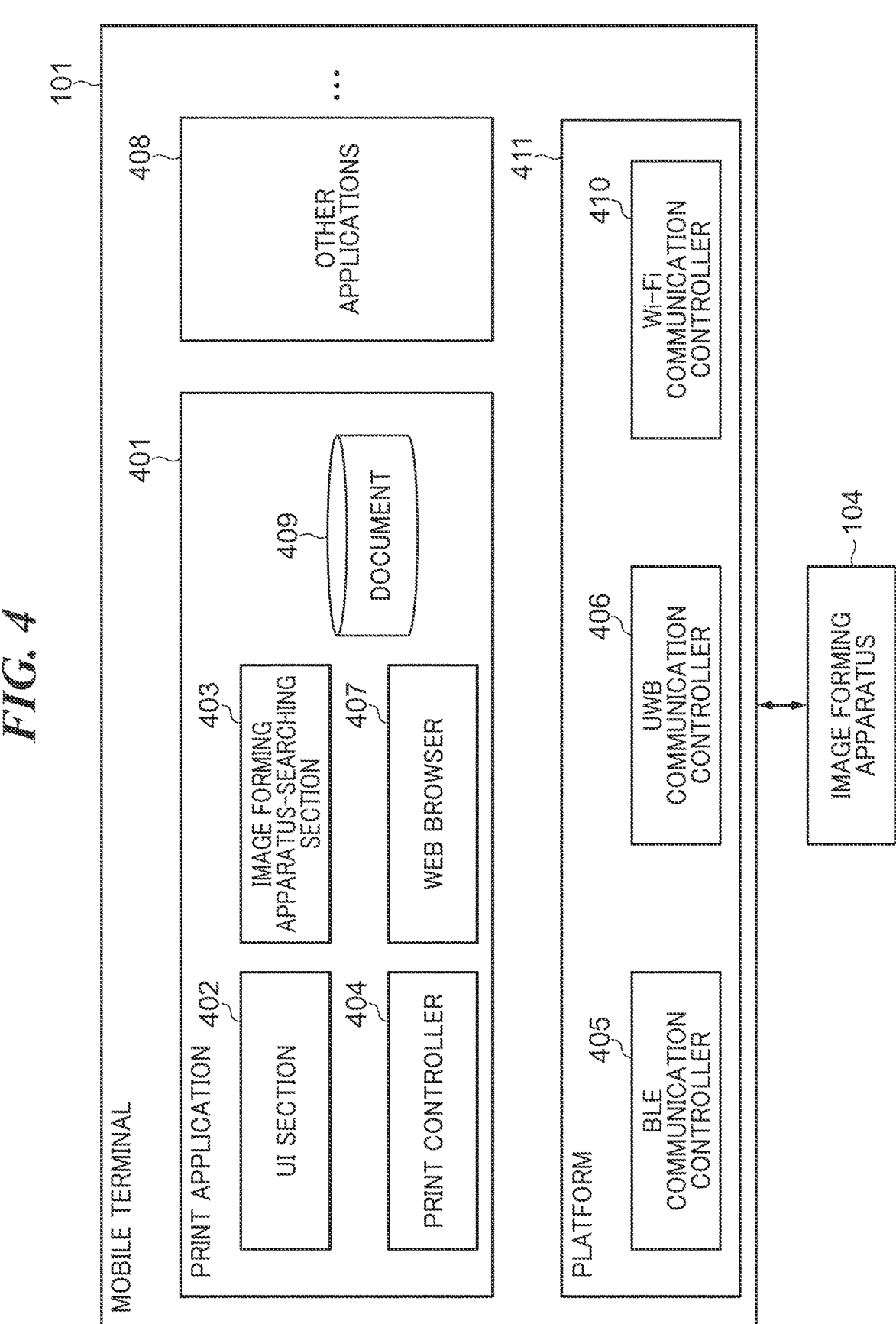
FIG. 4 is a block diagram useful in explaining a software configuration of the mobile terminal and a data area managed by software.

FIG. 4 is a block diagram useful in explaining a software configuration of the mobile terminal 101 and a data area managed by the software. The software shown in FIG. 4 is realized by the CPU 202 that executes programs loaded in the RAM 204.

As shown in FIG. 4, the mobile terminal 101 includes the print application 401, the other applications 408, and a platform 411.

The print application 401 is one of applications executed by the CPU 202 on the mobile terminal 101 for processing according to the present embodiment, and is installed in the ROM 203 as an application operating on the OS.

The platform 411 can be implemented by a platform, such as Google's Android (registered trademark) or Apple's iOS (registered trademark). The platform 411 includes a device driver group for controlling a variety of hardware items and provides an application programming interface (API) for using the variety of hardware items for the applications operating on the platform 411. Here, an API conforming to the CSML specification standardized by the FiRa consortium as an organization promoting the use of UWB is provided for BLE communication and UWB communication. Here, the CSML is an abbreviation of Common Service Management Layer. Note that an API conforming to Apple's "Nearby Interaction" can be provided for BLE communication and UWB communication. In the first embodiment, the device driver group includes a BLE communication controller 405, a UWB communication controller 406, and a Wi-Fi communication controller 410.

As shown in FIG. 4, the print application 401 includes a user interface (UI) section 402, an image forming apparatus-searching section 403, a print controller 404, a Web browser 407, and a document 409.

The document 409 indicates an area of data stored in the RAM 204 and managed by the software. Further, the UI section 402 provides a user interface for enabling a user to set functions unique to the print application 401.

The image forming apparatus-searching section 403 searches the LAN 103 in which the mobile terminal 101 participates, for a network device supporting the multicast Domain Name System (mDNS). Then, the image forming apparatus-searching section 403 provides a function of acquiring detailed information from one of the network devices which can be reached on the LAN 103, to which the mobile terminal 101 can provide a print instruction (i.e. which is supported by the print application 401), by using IPP or IPP over SSL/TLS (IPPS). Here, IPP is an abbreviation of Internet Printing Protocol. Further, the communication system is not limited to mDNS and IPP. Further, the image forming apparatus-searching section 403 (search unit) also provides a function of searching for an image forming apparatus to which the mobile terminal 101 can provide a print instruction in the WPAN in which BLE transmission/reception can be performed by the BLE communication controller 405. Further, the image forming apparatus-searching section 403 provides a function of controlling communication for measuring a distance between the image forming apparatus found by the search and the mobile terminal 101 by the UWB communication controller 406 to thereby acquire distance information. Hereafter, although a description will be given of a case where the image forming apparatus found by the search is the image forming apparatus 104, the description is the same in a case where the image forming apparatus 105 or 107 is found by the search.

The print controller 404 provides a function of generating a print job provided to the image forming apparatus 104 and transmitting the generated print job as job data. The print application 401 can be equipped with not only a print instruction function, but also, for example, a function of providing a scan instruction to the image forming apparatus 104.

The UWB communication controller 406 on the platform 411 can transmit, after transmitting a print job to the image forming apparatus 104 found by the search, a ranging response in response to a ranging request received from the image forming apparatus 104 without particularly requiring a user to perform confirmation or operation on the UI section 402. That is, it is possible to trace a process of movement of a user under the access control based on ranging by the image forming apparatus 104.

Figure 8A:
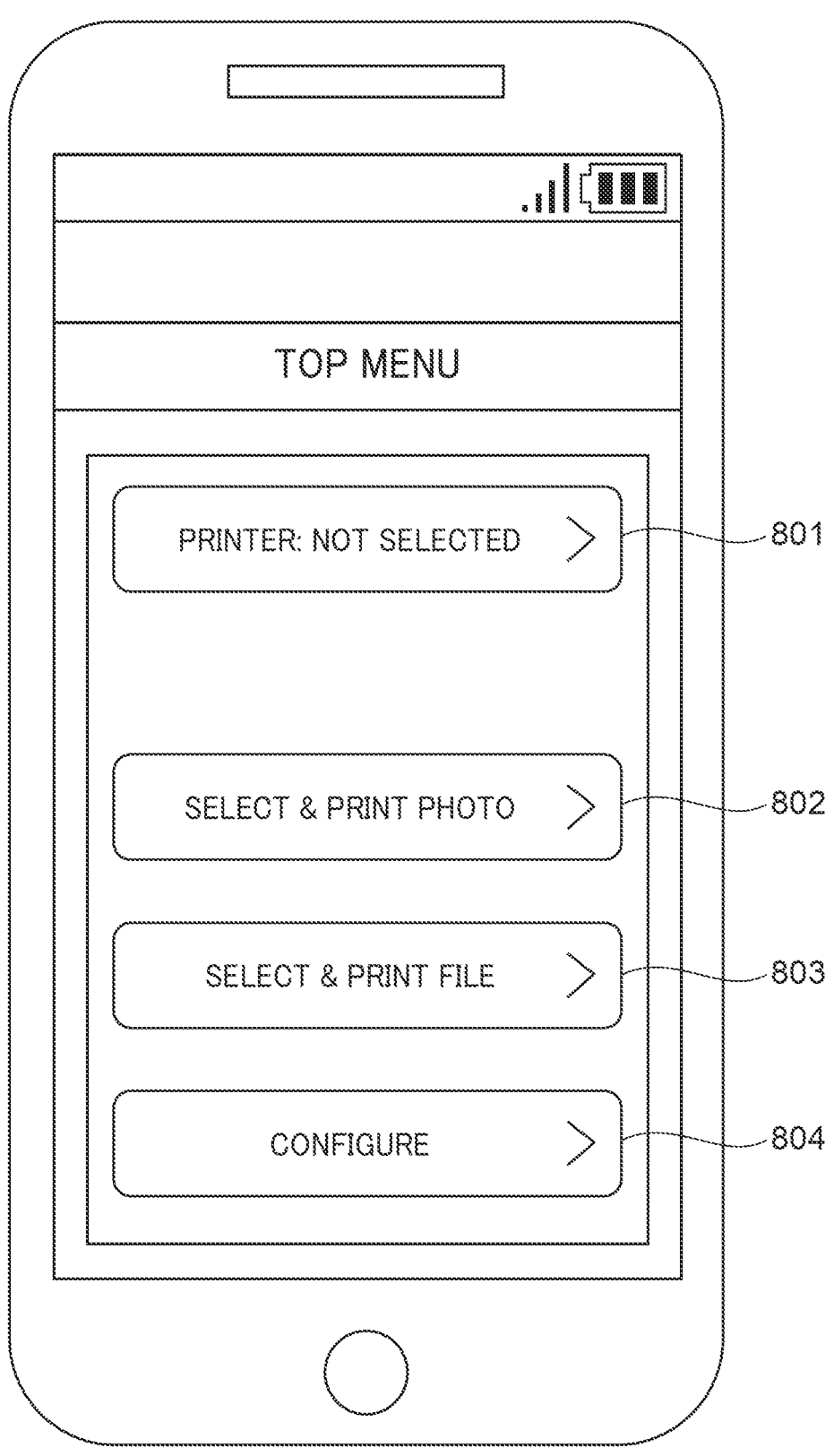
FIG. 8A is a diagram showing an example of a top menu screen of the mobile terminal.
Figure 8B:
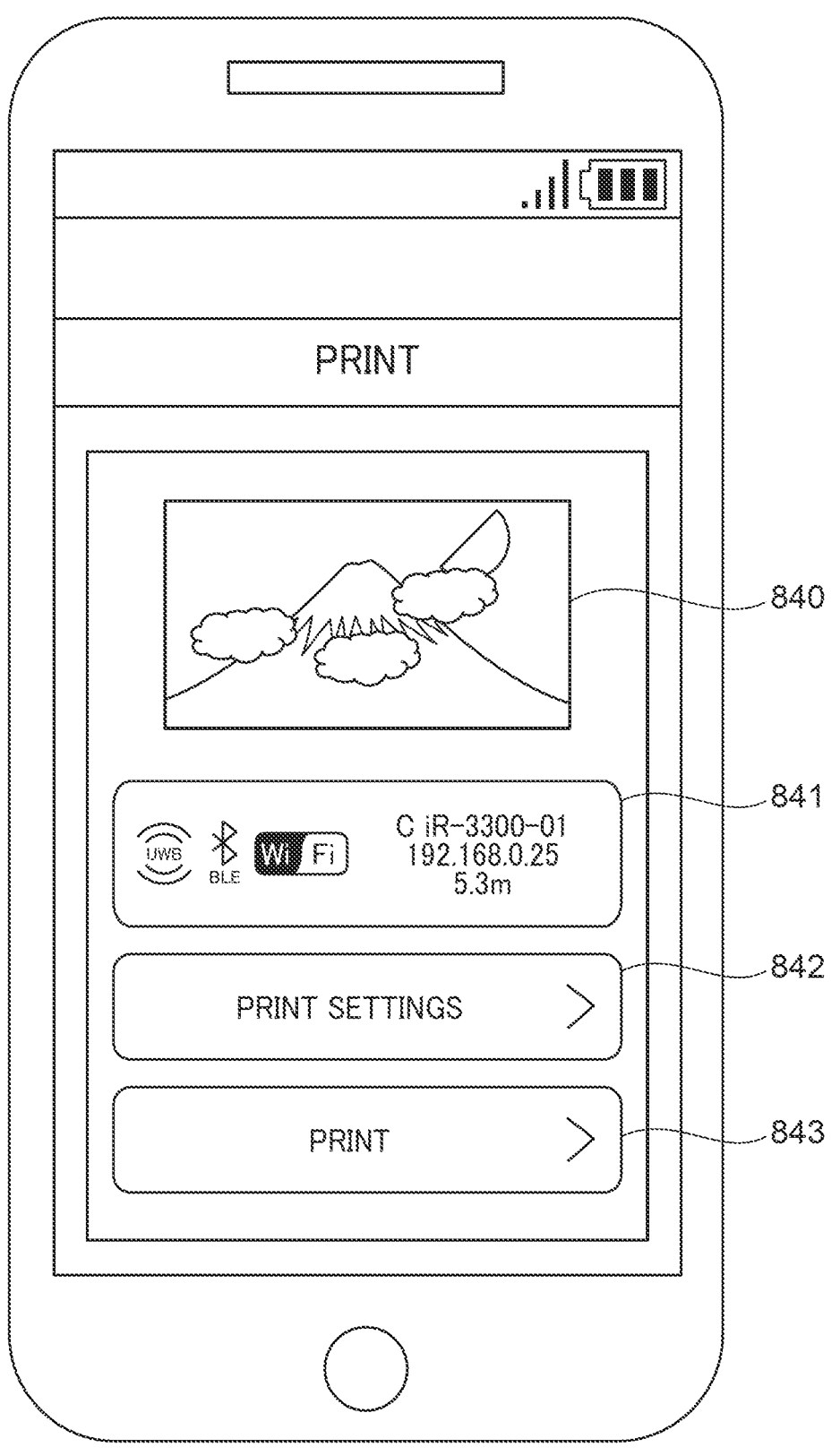
FIG. 8B is a diagram showing a print instruction screen of the mobile terminal.
Figure 8C:
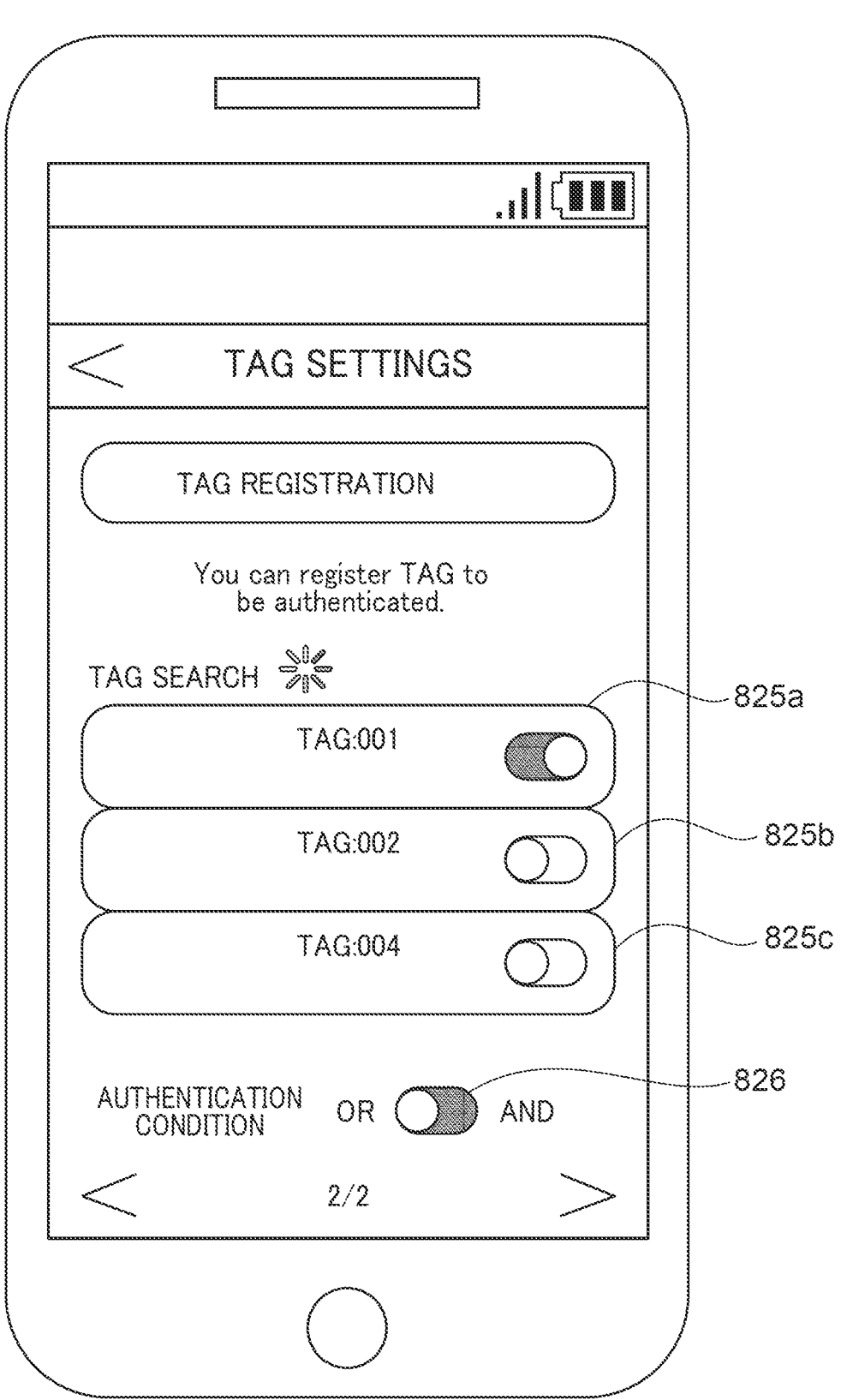
FIG. 8C is a diagram showing a tag setting screen of the mobile terminal.

Thus, in the present embodiment, it is possible to realize tracing of movement of a user without requiring a user operation on a ranging target of the image forming apparatus 104. Therefore, the ranging target of the image forming apparatus 104 is necessarily required to be equipped with the UWB communication function but is not necessarily required to be equipped with a UI, such as the UI of the mobile terminal 101. That is, a mobile communication device which is not equipped with, for example, the display controller 207, the input controller 208, the display 215, and the touch panel, appearing in FIG. 2, and the UI section 402 appearing in FIG. 4 can also be the ranging target of the image forming apparatus 104. Examples of this mobile communication device include an ID card and a USB tag, such as Apple's Air Tag. Specifically, by registering a desired USB tag by using a user interface (tag setting screen)

shown in FIG. 8C in advance, it is possible to set the tag as a target of the access control (ranging target) from the image forming apparatus 104.

Figure 5:
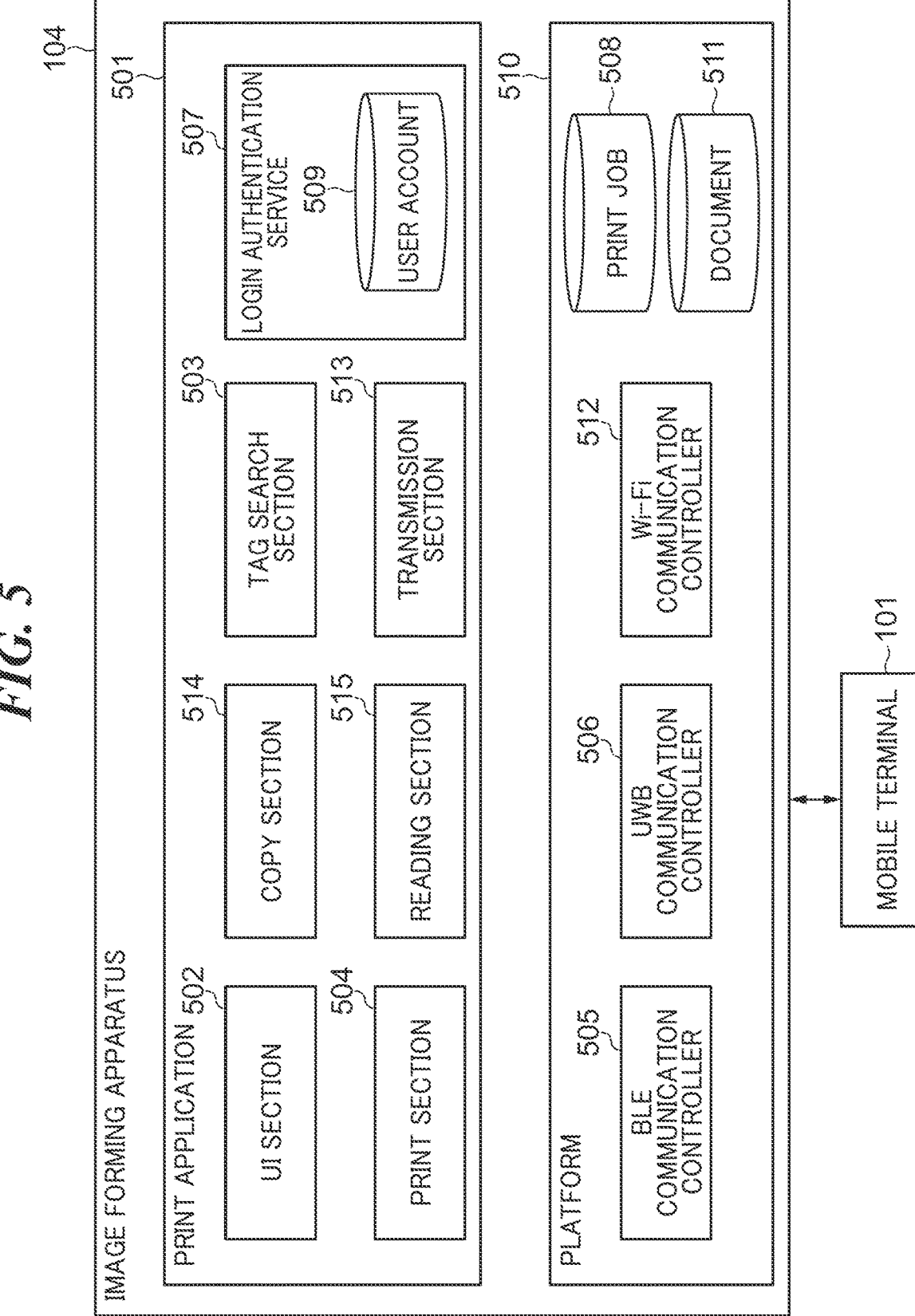
FIG. 5 is a block diagram useful in explaining a software configuration of the image forming apparatus and a data area managed by software.

FIG. 5 is a block diagram useful in explaining a software configuration of the image forming apparatus 104 and a data area managed by the software. Note that the image forming apparatuses 105 and 107 have the same software configuration, and hence description thereof is omitted. Further the software shown in FIG. 5 is realized by the CPU 1201 that executes programs loaded in the RAM 1202.

As shown in FIG. 5, the image forming apparatus 104 has a print application 501, a login authentication service 507, and a platform 510.

The print application 501 is one of applications executed by the CPU 1201 on the image forming apparatus 104 for processing according to the present embodiment, and is installed in the ROM 1203 as an application operating on the OS.

Referring to FIG. 5, a print job management area 508 and a document management area 511 in the platform 510 indicate areas of data stored in the RAM 1202 or the HDD 1204 and managed by the software. Similarly, a user account management area 509 in the login authentication service 507 also indicates an area of data stored in the RAM 1202 or the HDD 1204 and managed by the software.

The platform 510 can be formed such that it includes an OS, such as Linux (registered trademark), a JAVA (registered trademark) virtual machine, an OSGi (registered trademark) framework, and a device driver group. The JAVA is a registered trademark of Oracle Corp. The OSGi framework is a JAVA-based service platform defined by OSGi Alliance (standardization organization).

The platform 510 includes the device driver group for controlling a variety of hardware items and provides an API for using the hardware for the applications operating on the platform 510. In the first embodiment, the device driver group includes a BLE communication controller 505, a UWB communication controller 506, and a Wi-Fi communication controller 512. For example, the BLE communication controller 505 is a device driver for controlling the BLE communication section 1272, and the Wi-Fi communication controller 512 is a device driver for controlling the Wi-Fi communication section 1271. Further, the USB communication controller 506 is a device driver for controlling the UWB communication section 1273. As for the protocol control using BLE communication and UWB communication, an API conforming to the CSML specification which is standardized by the above-mentioned FiRa consortium is provided here. Note that an API conforming to Apple's Nearby Interaction can be provided for BLE communication and UWB communication. Further, although not shown, a printer module for controlling the printer section 20 and a scanner module for controlling the scanner section 10 also exist in this platform 510. Further, the platform 510 provides an API for reading and writing data from and into the print job management area 508 and the user account management area 509, for the applications.

The login authentication service 507 is an application that provides a login function used when a user uses the image forming apparatus 104.

As shown in FIG. 5, the print application 501 has a UI section 502, a copy section 514, a tag search section 503, a print section 504, a reading section 515, and a transmission section 513.

Figure 10A:
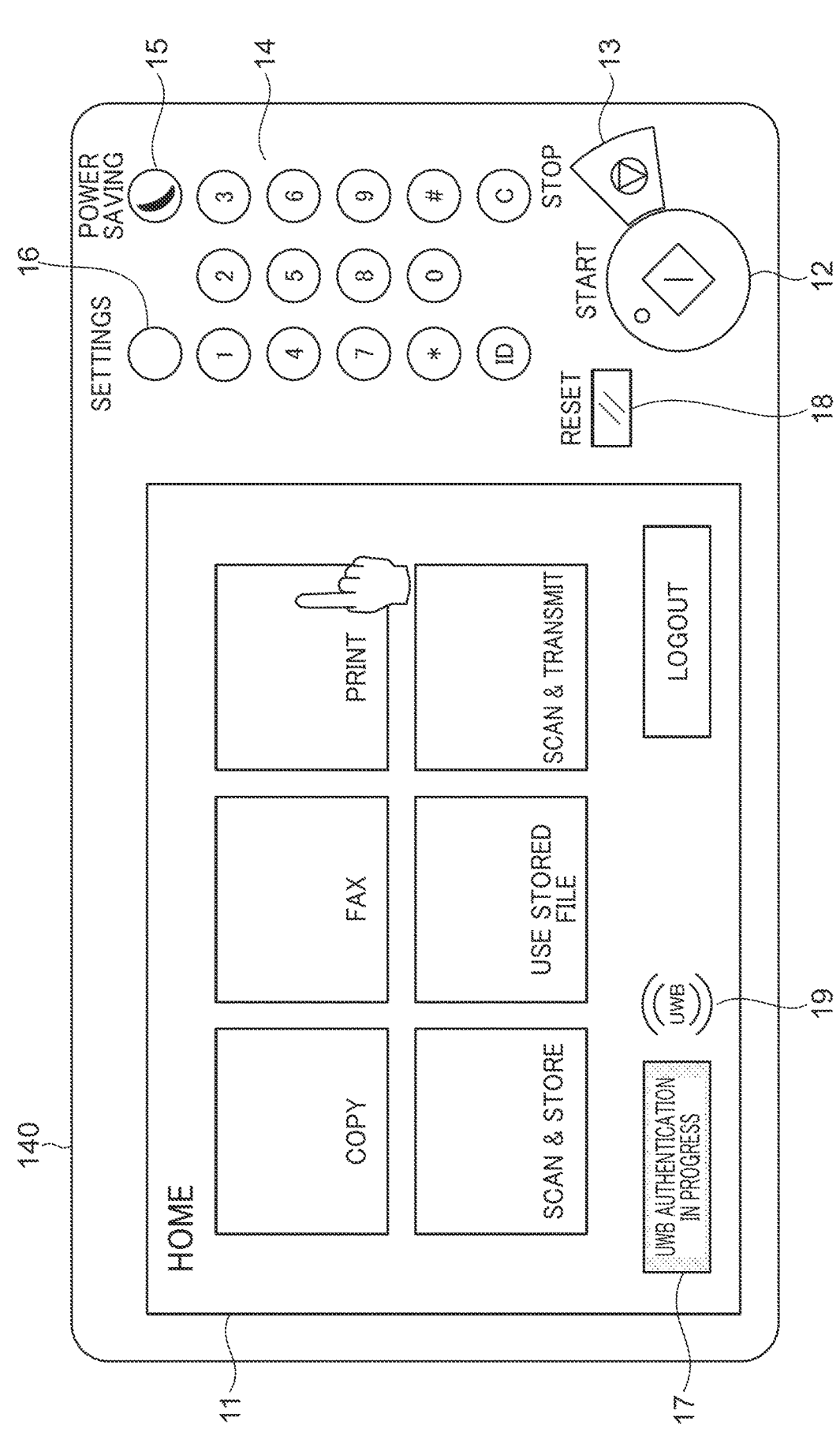
FIG. 10A is a diagram showing a home screen of the image forming apparatus.

The copy section 514 controls the reading section 515 and the print section 504 via the platform 510 to execute copying. The print section 504 provides a function of printing document data stored in the document management area 511 and a print job stored in the print job management area 508. The outputs of copying and printing, to be performed by the copy section 514, the reading section 515, the print section 504, and the like, are executed via the API of the platform 510, and the platform 510 records the number of prints in a counter, not shown. The transmission section 513 provides a function of transmitting document data acquired from the reading section 515 to the outside. The UI section 502 provides a user interface, such as a menu screen, for selecting a function unique to the application (such as copy, print, and transmission) from the console section 140. For example, a home screen 11 shown in FIG. 10A is displayed on the console section 140.

The tag search section 503 searches for a UWB tag as a ranging target on the LAN 103 in which the image forming apparatus 104 participates. For this search, the BLE communication controller 505, the UWB communication controller 506, the Wi-Fi communication controller 512, or the like are used.

Then, TWR ranging, described hereinafter, is performed by the UWB communication controller 506 (ranging unit) with respect to the retrieved UWB tag as the ranging target. The access control is performed based on a result of TWR ranging performed between the ranging target and the image forming apparatus 104.

At this time, a user account and distance information are shared between the user account area 509 managed by the login authentication service 507 and the print job management area 508 recorded and updated by the UWB communication controller 506. If it is determined based on this shared information that the distance information satisfies a predetermined condition (first condition), the login authentication service 507 performs authentication processing.

In the user account management area 509 managed by the login authentication service 507, as shown in FIG. 12, information items of User_name, Pass_word, IC_card, and Mail_Address are at least recorded and managed.

User_name is an information item for identifying a user (login ID), and Pass_word is a password associated with User_name. IC_card is an IC card number of an IC card held by a user, and Mail_Address is a mail address of a user.

Further, in the image forming apparatus 104 in the data processing system 1, it is possible to record and manage one or more identification information UWB_tag1/2/3/ . . . of the UWB tag as the ranging target in the UWB communication controller 506.

Further, in the print job management area 508 as the management area in the platform 510, data and contents of a job received from a user at any time are recorded and managed. Specifically, in the print job management area 508, information of the UWB tag, including the mobile terminal 101 on which access control is performed, is recorded in a state associated with User_name of a user who has issued a print job.

In the print job management area 508, information items of JOBID, JOB_type, JOB_Status, User_name, TAG_panid, Tag_addr, and Rang_Value, appearing in FIG. 13, are at least included.

JOBID indicates an identification number unique to a job, JOB_type indicates a job type, and JOB_Status indicates an execution status of a job.

User_name indicates a user who has issued a job, and TAG_panid indicates a personal area network ID included in the UWB tag information of the ranging target.

Tag_addr indicates an address of the UWB tag as the ranging target, and Rang_Value indicates a ranging value measured with respect to the UWB tag as the ranging target.

Further, in the print job management area 508, additional attributes, such as Rang_set (x) and "terminal", which are access control parameters associated with a job received from the mobile terminal 101, appearing in FIG. 13, can be included. Here, Rang_set (x) indicates a distance condition for performing the access control, and "terminal" indicates a type of a terminal.

The login authentication service 507 and the UWB communication controller 506 share the ranging information between the image forming apparatus 104 and the UWB tag as the ranging target in a state associated with User_name stored in the respective management areas. The login authentication service 507 acquires the ranging information from this shared information and performs the access control.

Further, as shown in FIG. 8C, a user interface (tag setting screen) on which a desired UWB tag, which is a target of the access control (ranging target), can be registered is provided. Therefore, the number of items of UWB tag information in the job management information shown in FIG. 13 is not required to be one. For example, as in the information in the user account management area 509, shown in FIG. 12, for a user using a plurality of UWB tags, ranging is performed on the plurality of UWB tags, and the authentication processing can be performed by the access control based on the obtained ranging information. With this, it is possible to increase the security level.

Further, when authentication is performed by the login authentication service 507, the print section 504 receives a print job (job data) transmitted from the mobile terminal 101 and then temporarily stored in the print server 150, and executes processing for printing the received print job. Further, the print section 504 can provide a function of automatically executing printing based on the above-mentioned ranging information.

Figure 10B:
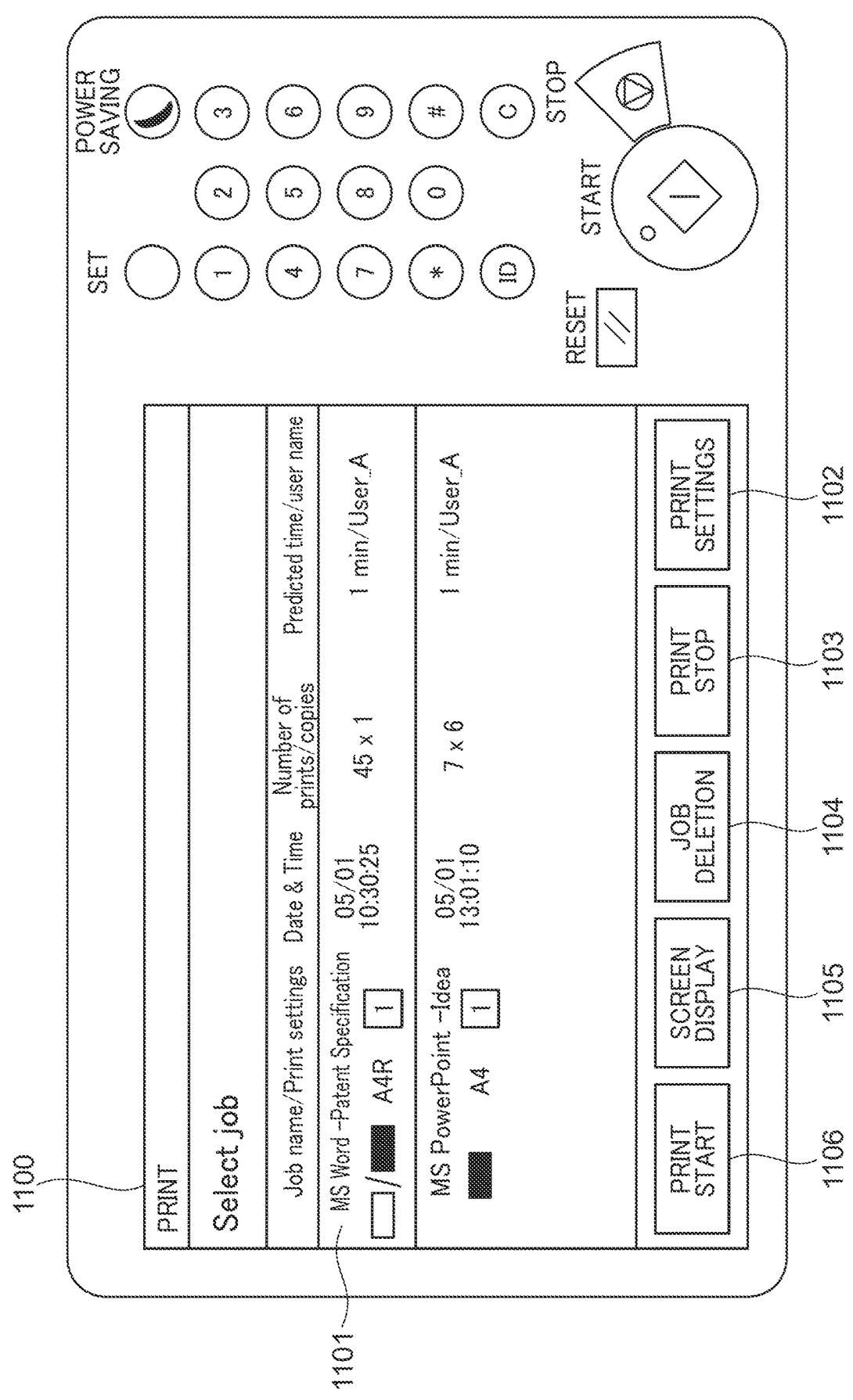
FIG. 10B is a diagram showing a print job selection screen of the image forming apparatus.
Figure 10C:
FIG. 10C is a diagram showing an example of a UWB access control-setting screen of the image forming apparatus.

Further, the login authentication service 507 can perform authentication processing by combining another login method and the above-mentioned ranging information according to settings made on a UWB access control-setting screen 1110 shown in FIG. 10C. With this, it is also possible to perform authentication using a combination of reading of an IC card managed by IC_Card appearing in FIG. 12 and an operation of inputting a password managed by Pass_word appearing in FIG. 12 from a keyboard, in accordance with a user's intention.

In the illustrated example, for login authentication, the access control based on UWB ranging and authentication using the IC card are set as AND conditions, and the keyboard input is set as an OR condition. In this case, authentication is performed in a case where a user (ranging target) has moved into the authentication distance, and a predetermined IC card has been successfully read by the image forming apparatus 104.

Figure 6:
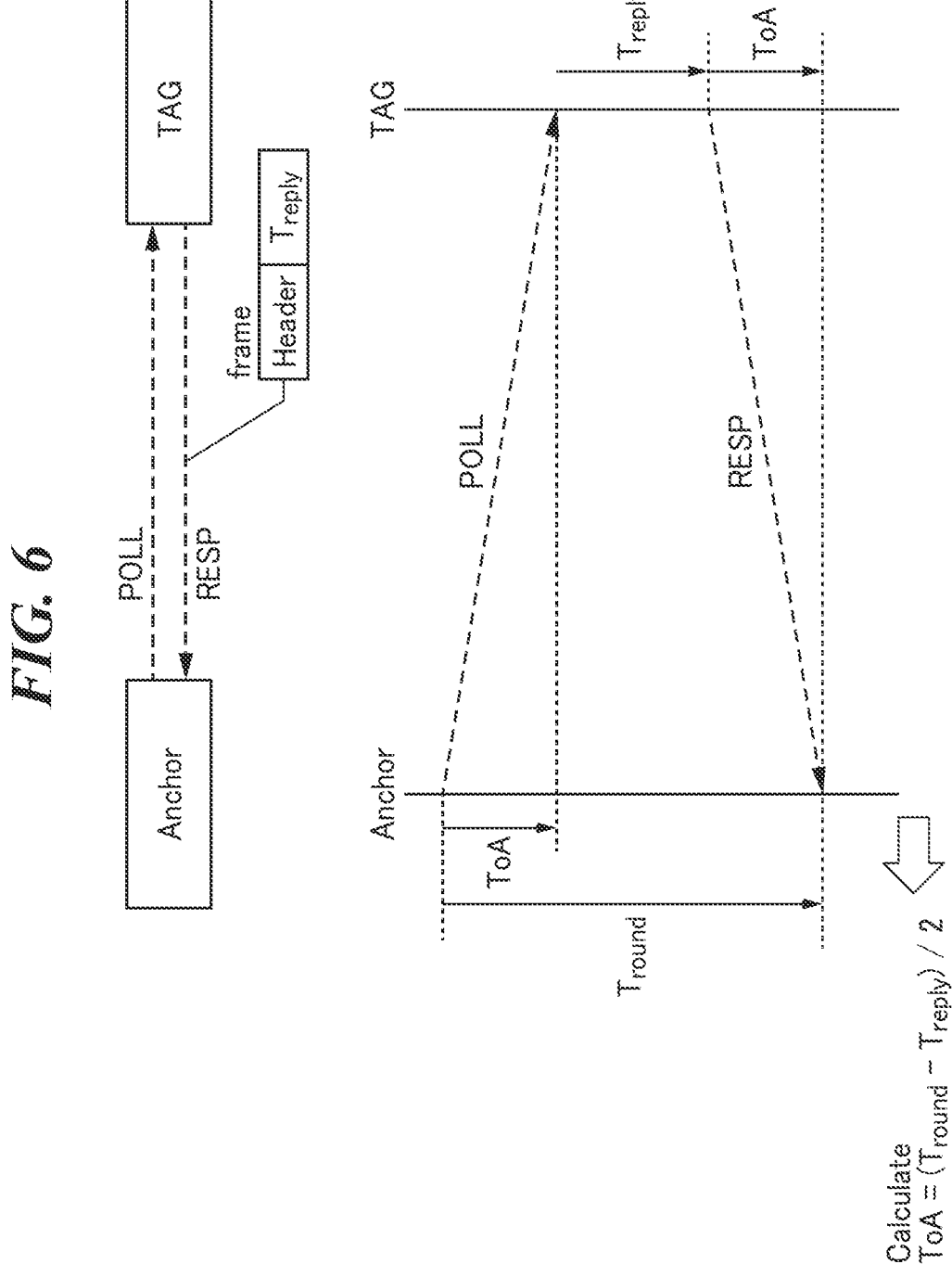
FIG. 6 is a diagram showing a ranging method using UWB communication, which is applied in the data processing system.

FIG. 6 is a diagram showing the ranging method using UWB communication, applied in the data processing system 1. This ranging method is a method of measuring a distance between a tag and an anchor, which is defined by the IEEE 802.15.4 group. Specifically, the distance measurement is performed by calculation using a time period (ToA: Time Of Arrival) over which a frame reaches and a speed at which radio waves are propagated in space.

FIG. 6 shows a ranging method of Two Way Ranging (TWR: bidirectional ranging method) for bidirectionally transmitting a frame between the anchor and the tag. In TWR, the anchor serves as the execution entity of ranging, and the tag is the ranging target.

In a case where a distance from the tag is measured, the anchor issues a poll frame (ranging request data) to the tag. When the tag having received the poll frame recognizes that the destination of the poll frame is itself, the tag transmits a response frame (ranging response data) to the anchor after the lapse of a time period ($T_{reply}$) set in advance from the reception moment. The $T_{reply}$ value is added to the response frame.

The anchor having received the response frame calculates the time period ToA required for the poll frame to reach the tag and for the response frame to reach the anchor, by using a time ($T_{round}$) from a time point at which the poll frame is transmitted to a time point at which the response frame is received and the $T_{reply}$ value included in the response frame. Finally, the anchor performs calculation processing for calculating a distance to the tag based on the time period ToA and the propagation speed (speed of light) of radio waves.

The image forming apparatus 104 and the mobile terminal 101 in the data processing system 1 each have the UWB communication controller which is capable of performing both roles of the tag and the anchor in the above-described TWR ranging method. Specifically, there are provided the UWB communication section 218 appearing in FIG. 2, the UWB communication section 1273 appearing in FIG. 3, the UWB communication controller 406 appearing in FIG. 4, and the UWB communication controller 506 appearing in FIG. 5. The above-mentioned frames are transmitted and received and calculation processing is performed in response to requests from the respective applications (such as the print applications 401 and 501, appearing in FIGS. 4 and 5, respectively), whereby the image forming apparatus 104 and the mobile terminal 101 can measure a distance between the self-apparatus and the ranging object.

Figure 7:
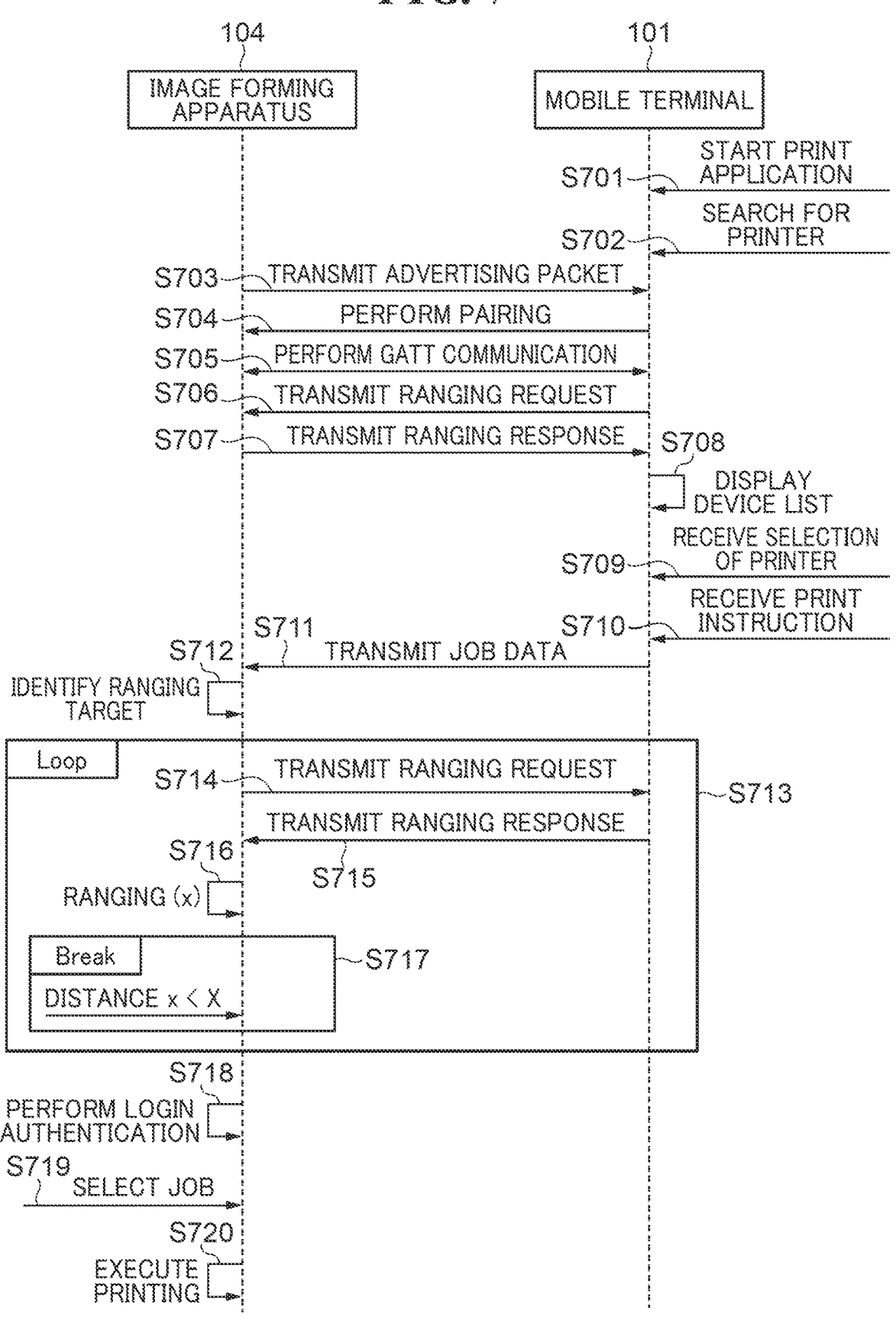
FIG. 7 is a sequence diagram showing the whole operation process performed in the data processing system according to the first embodiment.

FIG. 7 is a sequence diagram showing the whole operation process performed in the data processing system 1 according to the first embodiment.

In the present process, first, a user having logged in the mobile terminal 101 operates the mobile terminal 101 to start the print application 401 and provides an instruction for searching for an image forming apparatus to the mobile terminal 101. Upon receipt of the instruction, the mobile terminal 101 searches for an image forming apparatus which is transmitting an advertising packet and displays image forming apparatuses found by the search on a printer search screen shown in FIG. 8D in a state selectable by the user. When the user selects the image forming apparatus 104 from the image forming apparatuses displayed on the printer search screen, the mobile terminal 101 transmits a print job to the image forming apparatus 104. Then, the mobile terminal 101 and the image forming apparatus 104 communicate with each other and operate in cooperation with each other until the print operation is completed by the image forming apparatus 104 having received the print job. The operations performed by the mobile terminal 101 and the image forming apparatus 104, as the feature of the present invention, will be described in detail with reference to the present sequence diagram. Note that in the present embodiment, in a case where the user selects one of the image forming apparatuses 105 and 107 from the image forming apparatuses displayed on the printer search screen, the same operation as the operation performed by the image forming apparatus 104, described below, is executed by the selected image forming apparatus.

The flow of operations shown in the sequence diagram in FIG. 7 is realized by the hardware and software components forming the mobile terminal 101 and the image forming apparatus 104, shown in FIGS. 2 to 5. Note that in the mobile terminal 101, the software components are operated by the CPU 202 that executes the programs loaded in the RAM 204. In the image forming apparatus 104, the software components are operated by the CPU 1201 that executes the programs loaded in the RAM 1202.

First, when a predetermined operation is received from the user on the mobile terminal 101, the CPU 202 starts the print application 401 (step S701). FIG. 8A shows a top menu screen displayed immediately after the print application 401 is started.

The top menu screen shown in FIG. 8A is a user interface for receiving a variety of input operations from a user and includes buttons 801 to 804.

The button 801 is for shifting the screen to a screen for selecting an image forming apparatus to which a print instruction is to be provided, and in a case where an image forming apparatus has not been selected yet, information to the effect that an image forming apparatus has not been selected yet is displayed as indicated by the button 801.

The button 802 is for shifting the screen to a screen for selecting a photo stored in the mobile terminal 101 and printing the selected photo. In a case where an image forming apparatus to which a print instruction is to be provided has not been selected yet, pressing of the button 802 is made ineffective.

The button 803 is for shifting the screen to a screen for selecting a file, such as a PDF file, stored in the mobile terminal 101 and printing the selected file. In a case where an image forming apparatus to which a print instruction is to be provided has not been selected yet, pressing of the button 803 is made ineffective similarly to the button 802.

The button 804 is for shifting the screen to a UWB authentication-setting screen (see FIG. 11) for performing UWB authentication setting necessary for measuring a distance from (ranging) the image forming apparatus to which a print instruction is to be provided and authentication based on the ranging, or the tag setting screen (see FIG. 8C) for registering desired UWB tag information.

Figure 11:
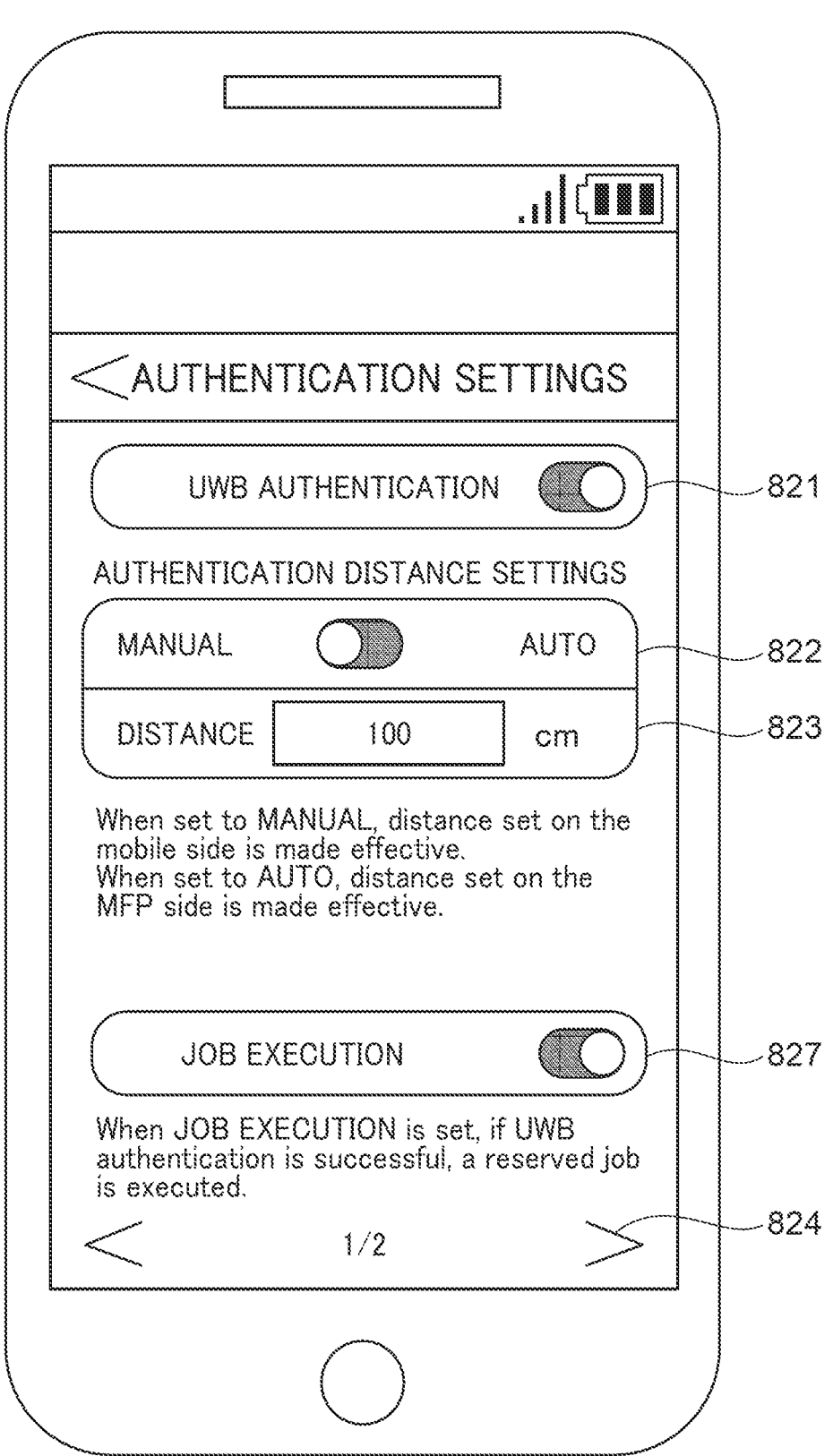
FIG. 11 is a diagram showing a UWB authentication-setting screen of the mobile terminal.

As shown in FIG. 11, the UWB authentication-setting screen includes toggle buttons 821, 822, and 827, an authentication distance input field 823, and a screen switching button 824.

The toggle button 821 (ranging authentication UI) receives selection of whether or not to perform authentication based on UWB ranging. Further, the toggle button 822 receives selection of whether to automatically or manually set a distance condition in a case where authentication based on UWB ranging is performed. The authentication distance input field 823 receives an input of a threshold value X used for ranging determination in a step S717, described hereinafter, in a case where the manual setting is selected by using the toggle button 822. Thus, the mobile terminal 101 has the UWB authentication-setting screen as the user interface on which the distance condition can be input. Therefore, in the present embodiment, it is possible to perform the practical access control according to a positional relationship between a location where the image forming apparatus 104 is installed, a traffic line of the user carrying the UWB tag (e.g. the mobile terminal 101) as the ranging target, and so forth.

The toggle button 827 receives selection setting of whether or not to automatically execute a reserved job when the UWB authentication is successfully performed (job execution setting). Note that the job execution setting can be set as an item of selection setting on a print instruction screen shown in FIG. 8B. The job execution setting can be notified to the image forming apparatus 104 according to UWB authentication settings, referred to hereinafter.

The screen switching button 824 shifts the screen from the UWB authentication-setting screen (see FIG. 11) to the tag setting screen (see FIG. 8C) when pressed by a user.

As shown in FIG. 8C, the tag setting screen is an input reception screen for registering a desired UWB tag as a tag for authentication and includes toggle buttons 825a to 825c and a toggle button 826. The UWB tag refers to a device which can perform wireless communication as a UWB tag, such as an Apple's Air Tag®, and is only required to be a communication device generally comprised of a power source, such as a battery, a UWB communication section, a BLE communication section, a storage section, and a control IC, such as a microcomputer. In the present embodiment, a desired number of UWB tags which are independent from the mobile terminal 101 can be registered. Note that the method of registering a desired UWB tag is a general method, specifically, a method of performing BLE pairing and then performing registration by receiving UWB tag information via GATT communication. Further, when registering a UWB tag, a desired name can be input. As shown in FIG. 8C, on the tag setting screen, the toggle buttons 825a to 825c for registration, displaying names of the UWB tags found by the search, respectively, are provided. In FIG. 8C, the UWB tag named as "TAG 001" is registered as a tag for performing authentication, by the user turning on the toggle button 825a.

The toggle button 826 receives a combination setting (AND/OR) in a case where a plurality of UWB tags are selected as authentication targets on the tag setting screen. In the image forming apparatus 104, not only the mobile terminal 101, but also a desired UWB tag registered as described above can be treated as a target of ranging by UWB communication.

Referring again to FIG. 7, in the mobile terminal 101, when the user presses the button 801 on the top menu screen (see FIG. 8A), the CPU 202 starts to search for an image forming apparatus serving as a candidate of the print instruction target (data transmission destination) (step S702). When this search is started, the display is simultaneously switched from the top menu screen to the printer search screen (see FIG. 8D), for sequentially displaying image forming apparatuses found by the search.

In the present embodiment, all of the image forming apparatuses 104 to 107 in the data processing system 1 are searched for. However, since the image forming apparatus 106 is not equipped with the UWB communication function as a feature of the present invention as mentioned above, the following description is given only of communication between the image forming apparatuses 104, 105, and 107 out of the image forming apparatuses found by the search, and the mobile terminal 101.

When the search in the step S702 is started, first, the CPU 202 receives advertising packets transmitted from the image forming apparatuses 104, 105, and 107 in the data processing system 1 shown in FIG. 1 (step S703). Next, the CPU 202 performs pairing for establishing authentication connection for performing data communication between the mobile terminal 101 and each of the image forming apparatuses 104, 105, and 107 (step S704).

Next, information necessary for the print application is exchanged by GATT communication between the mobile terminal 101 and each of the image forming apparatuses 104, 105, and 107 (step S705: operation of an exchange unit). The information to be exchanged includes a structure of data held in each of the image forming apparatuses 104,

105, and 107 as the BLE apparatuses and a method of operation, which are defined as a profile. In the present embodiment, in this GATT communication, UWB tag information unique to the UWB communication section 1273 included in each of the image forming apparatuses 104, 105, and 107, and UWB tag information unique to the UWB communication section 218 included in the mobile terminal 101 are also exchanged. Further, in the present embodiment, in this GATT communication, a communication capability message 910, referred to hereinafter, is also exchanged between the mobile terminal 101 and each of the image forming apparatuses 104, 105, and 107. Note that the UWB tag information and the communication capability message 910 of each of the image forming apparatuses 104, 105, and 107 can be added to the advertising packet.

That is, in the process from the step S703 to the step S705, the communication setting information in UWB communication is exchanged by using BLE communication between the mobile terminal 101 and each of the image forming apparatuses 104, 105, and 107. The exchanged communication setting information in UWB communication at least includes address information of the packet transmission destination included in the UWB tag information, and role information and ranging method information in UWB communication, included in the communication capability message 910.

Further, by executing the process from the step S703 to the step S705, there are acquired, at least a model name, as the profile component of a basic image forming apparatus, and IP address information, as the profile component of a network communication apparatus which is a Wi-Fi device. These information items are displayed on a device list 811 on the printer search screen (see FIG. 8D) as the device information items of each of the image forming apparatuses 104, 105, and 107 in a step S708, described hereinafter.

Figure 9A:
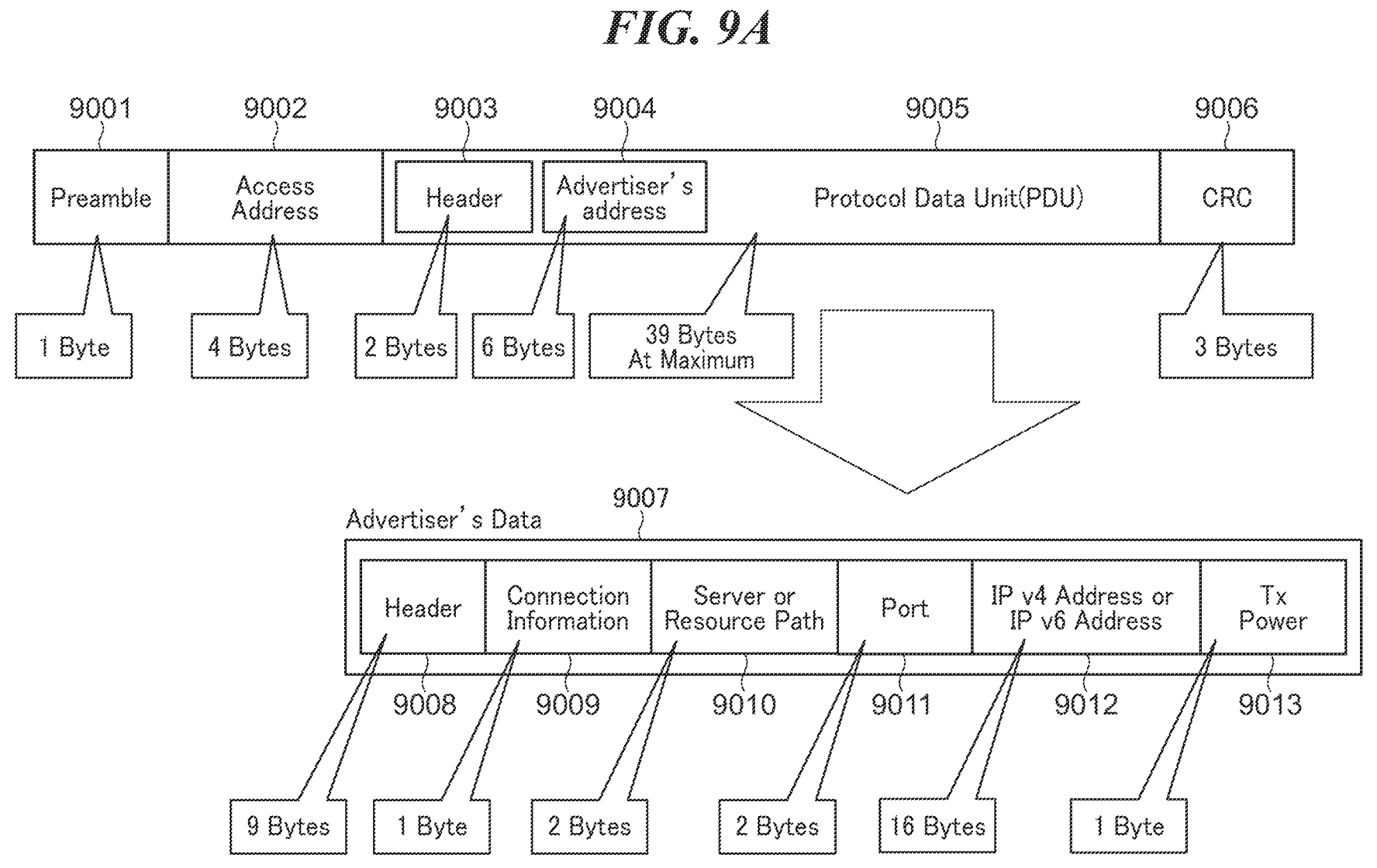
Figure 9B:
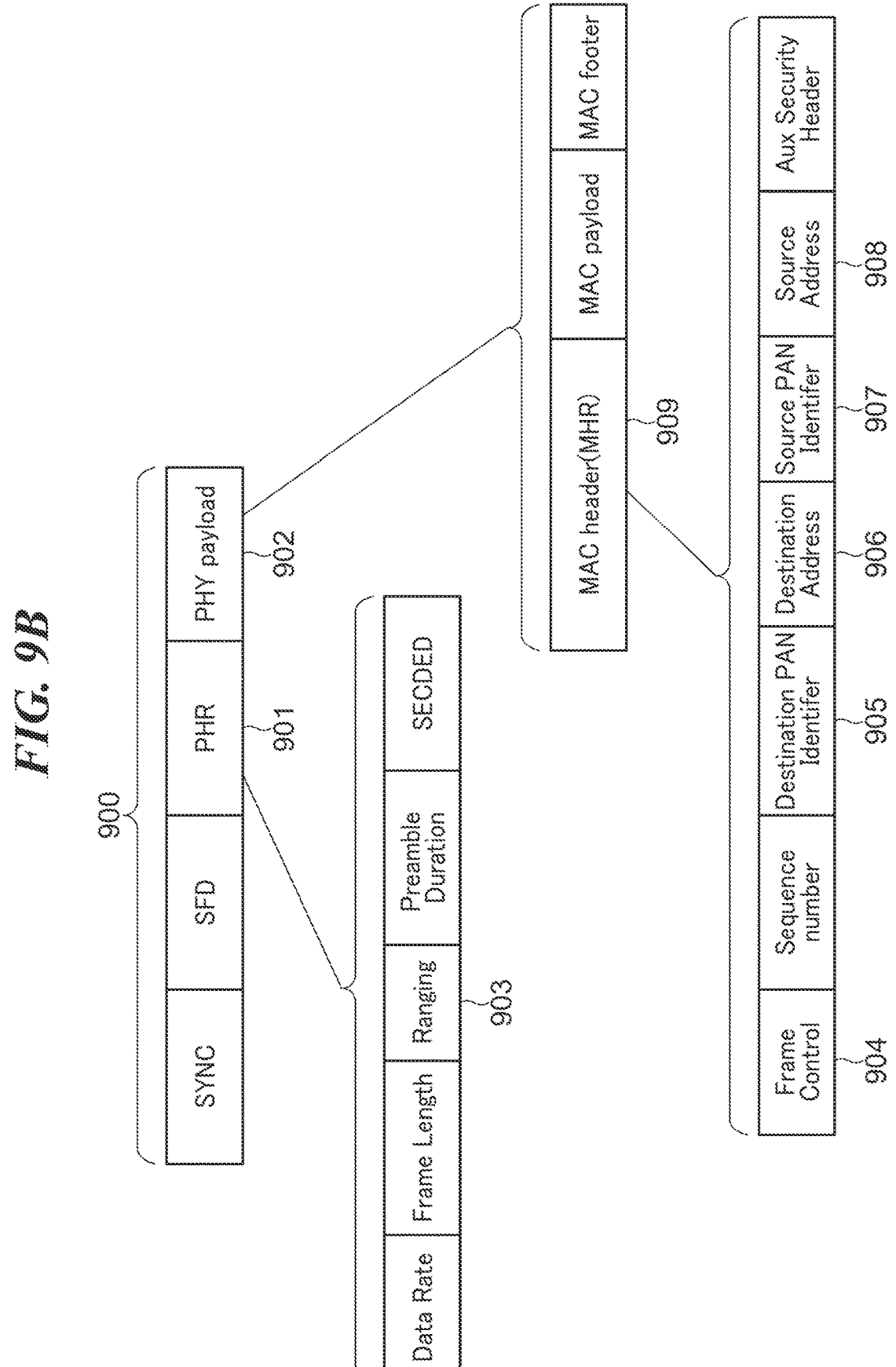
FIG. 9B is a diagram showing a packet specification used in the UWB ranging in the data processing system.
Figure 9C:
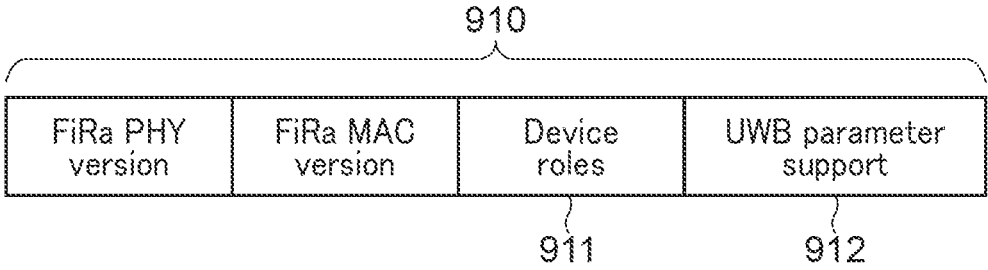
FIG. 9C is a diagram showing a specification of a communication capability message in Common Service Management Layer (CSML) which is a communication protocol defined by FiRa and can be applied to the UWB ranging in the data processing system.
Figure 9D:
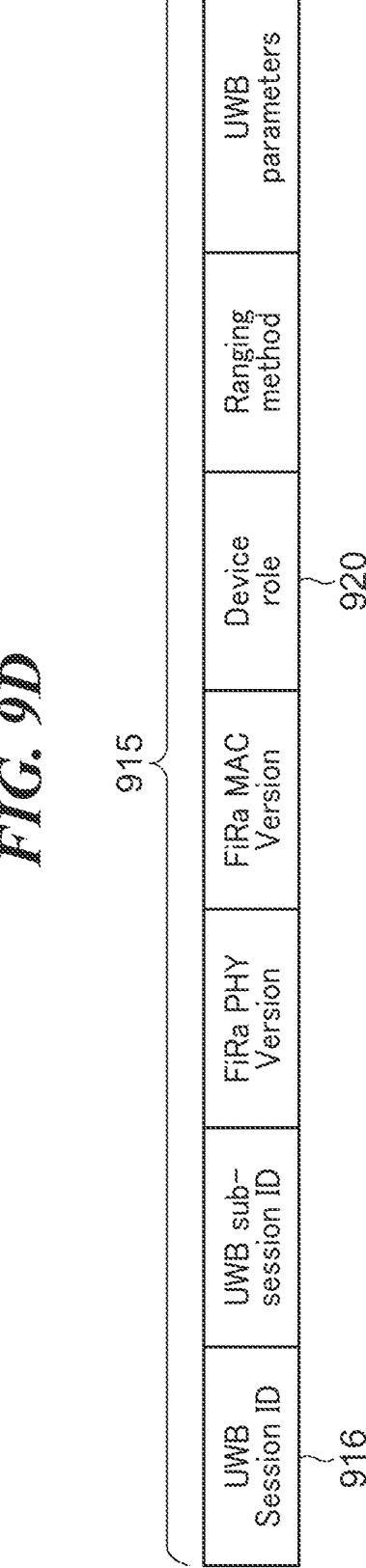
FIG. 9D is a diagram showing a specification of a communication configuration message in the communication protocol (CSML).

The UWB tag information is information formed by at least a PAN ID, addresses of a packet transmission source and a packet transmission destination, and an IEEE 802-based address which is uniquely allocated to a wireless terminal for enabling unique identification thereof. Here, the PAN ID is an abbreviation of a Personal Area Network ID and is an ID, defined by IEEE 802.15.4z, for identifying a partner of UWB communication. Further, the UWB tag information can include information indicating a UWB communication supporting device in a broad sense. Further, the communication capability information and the communication setting information, necessary for UWB communication, as shown in FIGS. 9B to 9D, can be included in the GATT communication profile.

Note that as the communication control between the mobile terminal 101 and the image forming apparatus 104 is performed, here, according to the communication protocol based on the CSML of the FiRa consortium defined in the specification of IEEE 802.15.4. Note that the communication control between the mobile terminal 101 and the image forming apparatus 104, can be performed based on the Apple's Nearby Interaction Protocol. As information for identifying a communication partner for the UWB communication in the specifications of these communication protocols, UWB tag information is used.

The above-mentioned standards have a property that a UWB wireless chip consumes more energy than other wireless techniques, and hence these standards are common in that information necessary for UWB communication, such as UWB communication capability, communication settings, and data necessary between applications, is exchanged by using a secondary channel so as to detect a peripheral UWB device before performing the UWB communication. As the secondary channel, BLE communication is used in most cases, as is also the case with the present embodiment.

FIG. 9A is a diagram showing a structure of a BLE advertising packet transmitted from each of the image forming apparatuses 104, 105, and 107, equipped with the UWB communication function, appearing in FIG. 1.

Although there are a plurality of packet forms of the advertising packets transmitted from the image forming apparatuses 104, 105, and 107, here, the advertising packet of the form of Apple's AirPrint Bluetooth Beacon is transmitted. Further, the BLE advertising packet is radio beacon data transmitted as a so-called beacon signal by broadcast transmission, and is transmitted at intervals of several milliseconds or several seconds.

First, at the top of the BLE advertising packet, Preamble 9001 used by a BLE wireless device for determining a signal reading timing is formed by 1 byte. Next, Access Address 9002 for inputting a value indicating that the present packet is a BLE advertising packet is formed by 4 bytes. Next, as a real data area, Protocol Data Unit (PDU) 9005 is formed by 39 bytes at the maximum. However, the PDU 9005 includes Header 9003 which consumes 2 bytes and Advertiser's address 9004 which consumes 6 bytes, and hence Advertiser's Data 9007 as real data is formed by 31 bytes as the remainder.

As an example of the Advertiser's Data 9007, the format of AirPrint Bluetooth Beacon will be described with reference to FIG. 9A. First, Header 9008 as a common value of AirPrint Bluetooth Beacon is formed by 9 bytes. Next, Connection Information 9009 indicating information, such as the IP address format and whether an image forming apparatus transmitting an advertising packet is a printer or a print server, is formed by 1 byte. Next, Server or Resource Path 9010 indicating ID information of a printer, determined by the server, is formed by 2 bytes. Next, Port 9011 indicating a Port number is formed by 2 bytes. Next, IP address (IP v4 Address or IP v6 Address) 9012 is formed by 16 bytes. Finally, Tx Power 9013 indicating the intensity of a signal transmitted from the beacon is formed by 1 byte. The end of the BLE advertising packet has CRC 9006 for code error detection, which is formed by 3 bytes. Thus, the whole advertising packet is formed.

The example of the advertising packet is described as above. Note that since BLE communication is used as the secondary channel so as to exchange the necessary information before UWB communication, as described above, and hence, for example, the UWB tag information and the UWB communication-setting information can be included in the advertising packet.

FIG. 9C is a diagram showing a specification of the communication capability message 910 in the communication protocol definition (CSML) defined by FiRa, which can be applied to UWB ranging in the data processing system 1. Here, the CSML is an abbreviation of Common Service Management Layer. The communication capability message 910 is a communication message in a network layer and a transport layer in the communication protocol stack. The information concerning compatibility between FiRa devices and communication capability is exchanged by using a communication channel of another band, such as BLE or NFC. In the present embodiment, the communication capability message 910 is exchanged by using GATT communication in the step S705.

In each of the mobile terminal 101 and the image forming apparatus 104, a communication protocol stack that is a component of the BLE communication controller 405 or 505

(see FIG. 4 or 5) and processes the communication capability message 910 as part of the API called by an application in an upper layer.

As the interface, the communication capability message 910 includes a physical layer version of FiRa PHY version and a MAC layer version of FiRa MAC version, defined by FiRa.

Further, the communication capability message 910 includes Device Roles 911 and UWB Parameter Support 912.

The Device Roles 911 indicates the role of UWB communication, i.e. which of the function of an anchor as the execution entity of ranging or the function of a tag as the ranging target is supported. Further, the UWB Parameter Support 912 includes settings related to supported ranging, such as Ranging Methods.

As for the image forming apparatus 104 and the mobile terminal 101, the Device Roles 911 indicates that they each support both modes of the anchor and the tag. Further, the image forming apparatus 104 and the mobile terminal 101 support at least TWR (Two Way Ranging) as the Ranging Methods.

FIG. 9D is a diagram showing a specification of a communication configuration message 915 in the communication protocol definition (CSML) defined by FiRa, which can be applied to UWB ranging in the data processing system 1. UWB communication settings in the communication configuration message 915 are determined by the exchange of the above-described communication capability message 910. As the UWB communication settings, for example, the role and the ranging method for performing the UWB communication between the image forming apparatus 104 and the mobile terminal 101 are determined. The communication configuration message 915 including these setting information items is exchanged between the image forming apparatus 104 and the mobile terminal 101.

In determining the UWB communication settings, the image forming apparatus 104 and the mobile terminal 101 perform negotiation (hereinafter referred to as the "mediation") between the FiRa devices as illustrated in the sequence diagram in FIG. 7.

In the data processing system 1, mediation of the roles of the anchor and the tag as UWB devices is performed based on requests from the respective applications of the mobile terminal 101 and the image forming apparatus 104. In the communication configuration message 915, a field of Device Rolles 920 indicating a roll to be determined by this mediation is provided. Specifically, first, the tag search section 503 of the print application 501 of the image forming apparatus 104 transmits a ranging request to the ranging target based on the information of the ranging target added to a print job generated by the print controller 404 of the print application 401 of the mobile terminal 101. In a case where the ranging target is the mobile terminal 101, in response to this ranging request received from the image forming apparatus 104, the above-described mediation is started between the image forming apparatus 104 and the mobile terminal 101, and the mediation of the roles as the UWB Devices is performed between the UWB communication controllers 406 and 506 in the respective platforms. The image forming apparatus 104 having received the print job transmits and receives the communication configuration message 915 so as to set the role of the self-apparatus as the anchor in order such that the self-apparatus becomes the execution entity (radio transmission source) of ranging, and executes ranging after changing its role from the tag to the anchor.

Further, in the data processing system 1, the role can be switched by the above-mentioned mediation such that ranging can be bidirectionally performed during the mobile print process. In the process of the steps in which the mobile terminal 101 searches for a device, performs ranging, and displays the device list, mediation of the roles is performed so as to set the mobile terminal 101 as the anchor and set the image forming apparatus 104 as the tag. After that, mediation of roles is performed again when the user has issued a print job, whereby the role of the image forming apparatus 104 is changed to the anchor, and the role of the mobile terminal 101 is changed to the tag, and then ranging is started.

Further, the communication configuration message 915 has a field of UWB Session ID 916 for holding a value of a session ID for identifying a target of the UWB communication processing, for each of different print jobs issued on a user-by-user basis, as one unit. With these fields of the Device Role 920 and the UWB Session ID 916, in a case where a plurality of users of the connection destinations exist, it is possible to individually identify each user.

Thus, the communication setting information for UWB communication is exchanged by using BLE communication. Note that the UWB Session ID 916 can be associated with a JOB ID of the job management information shown in FIG. 13, whereby cooperation is performed between the applications 401 and 501 (see FIGS. 4 and 5), and the UWB communication controller 406, and the BLE communication controllers 405 and 505 (see FIGS. 4 and 5). In this case, when the image forming apparatus 104 receives a plurality of jobs from the mobile terminals logged in (held) by respective different users, the CPU 1201 can process the plurality of jobs and perform the communication process control associated with the jobs in parallel simultaneously or in time division.

Referring again to FIG. 7, next, in the mobile terminal 101, the CPU 202 transmits a ranging request packet to the image forming apparatus 104 (step S706). Transmission of the ranging request packet is performed based on the UWB communication settings determined after exchanging the communication capability message 910 and the communication configuration message 915 by using BLE communication, and the above-described UWB tag information transmitted from the image forming apparatus 104. Note that the ranging request packet is a packet in a form necessary to execute the TWR ranging defined by IEEE 802.15.4z, shown in FIG. 6. The ranging request packet includes at least ranging request identification information, requesting source address information, request destination address information, and an IEEE 802-conformant address.

Next, the image forming apparatus 104 having received this ranging request packet transmits a ranging response packet to the mobile terminal 101 after the lapse of a predetermined time period (step S707). The mobile terminal 101 having received the ranging response packet calculates a distance based on the TWR ranging method shown in FIG. 6.

FIG. 9B is a diagram showing a packet specification used in UWB ranging in the data processing system 1. The packet specification for UWB ranging is defined as a structure of a UWB frame 900 in the physical layer and the data link layer (MAC) in the general communication protocol stack.

The UWB frame 900 is formed by fields of SYNC for holding a preamble for synchronizing between a transmitting device and a receiving device, SFD for holding a value indicating a boundary between the preamble and a PHY header, PHR 901, and PHY payload 902.

The PHR 901 is a field for holding the PHY header, and the PHY payload 902 is a field for holding a PHY payload.

The PHR 901 further has a filed of Ranging 903 for holding a flag for identifying whether or not the frame is a frame issued to perform ranging. For example, in a ranging request packet transmitted by the mobile terminal 101 or the image forming apparatus 104 to perform ranging, the flag of the Ranging 903 of the above-described frame structure is set to 1 by the UWB communication controller 406 or 506 (see FIG. 4 or 5).

Further, the PHY payload 902 is formed by MHR 909, MAC payload, and MAC footer, as shown in FIG. 9B.

The MHR 909 is a field for holding the MAC header and includes fields 904 to 908, as shown in FIG. 9B.

Reference numeral 904 indicates a field of Frame Control indicating the frame format used for control of the frame in the data link layer (MAC). Reference numeral 905 indicates a field of Destination PAN Identifier indicating a packet transmission destination PAN ID. Reference numeral 906 indicates a field of Destination Address indicating an address of a packet transmission destination.

Further, reference numeral 907 indicates a field of Source PAN Identifier indicating a packet transmission source PAN ID. Reference numeral 908 indicates a field of Source Address indicating an address of a packet transmission source.

As the PAN ID and the address information, held by these fields 904 to 908, the information unique to the apparatus is set by the UWB communication controllers 406 and 506 (see FIGS. 4 and 5). In the mobile terminal 101 in the data processing system 1, the PAN ID and the address information, acquired from the image forming apparatus selected on the printer search screen (see FIG. 8D), described next, are set in the fields 905 and 906.

In doing this, in the image forming apparatus 104, the UWB communication controller 506 analyzes the field 903 of Ranging and the fields 905 to 908 indicating the PAN IDs and addresses of the packet transmission source and the transmission destination, and so forth, of a frame forming the received ranging request packet. The UWB communication controller 506 generates a frame to which information of the time required to analyze the frame and perform the response processing is added, and transmits a ranging response packet to the mobile terminal 101 (step S707).

Figure 8D:
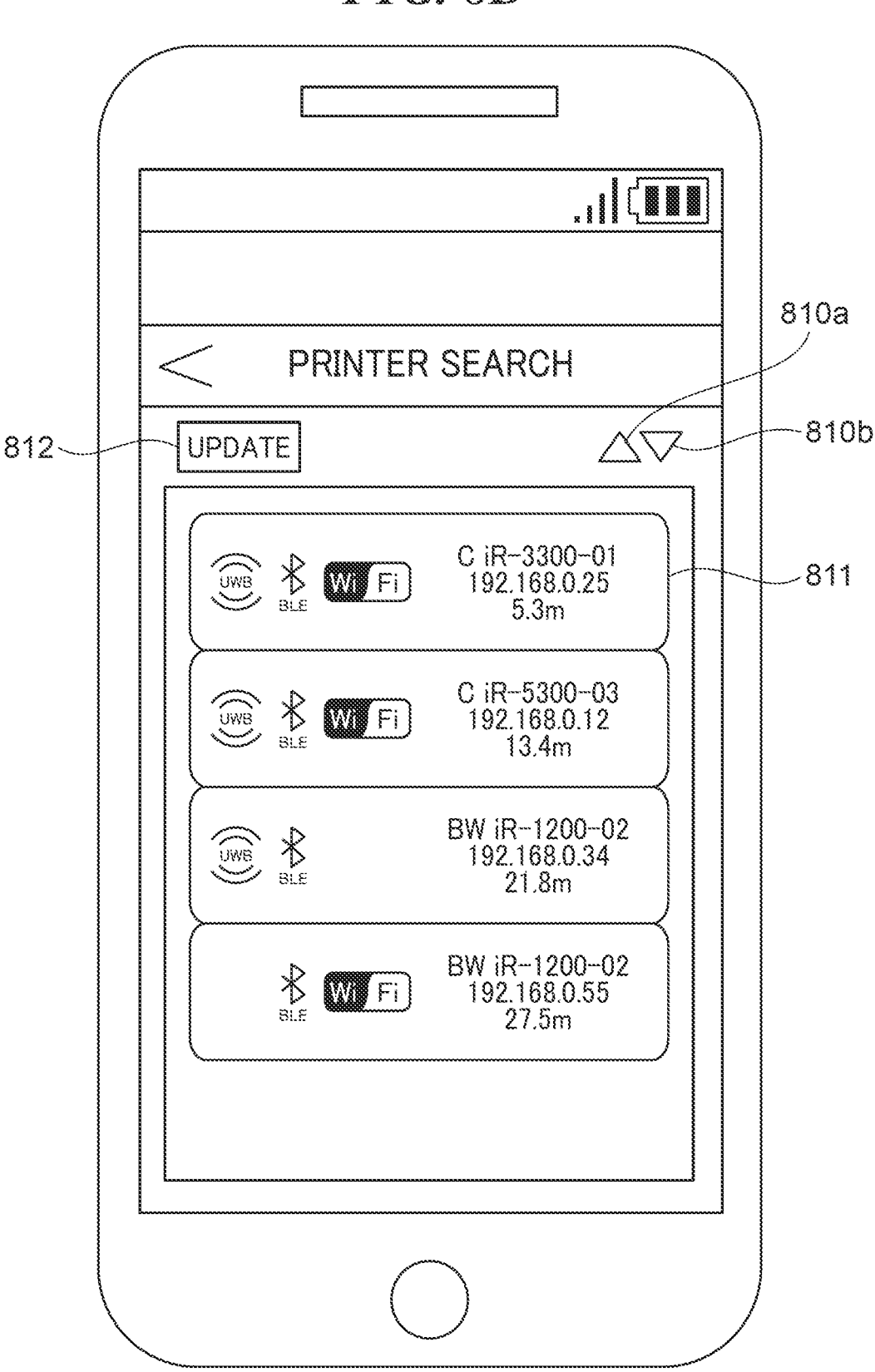
FIG. 8D is a diagram showing a printer search screen of the mobile terminal.

Next, in the mobile terminal 101, the CPU 202 displays a list of device information of the image forming apparatus found by the search group on the device list 811 of the printer search screen (see FIG. 8D) (step S708). The device information displayed in this step also includes the distance information calculated based on the ranging response packet received from each of the image forming apparatuses found by the search. Further, the printer search screen has an update button 812 as shown in FIG. 8D, and in a case where the update button 812 is pressed, the CPU 202 executes the steps S703 to S707 again. With this, the user can confirm a change in the status of the image forming apparatuses found by the search. Further, the mobile terminal 101 has buttons 810a and 810b as a user interface for setting the search frequency for periodically performing the update, and a device list-displaying screen on which the device list 811 is displayed can also be automatically updated. Specifically, the user can increase the search frequency by pressing the button 810a formed as a triangular mark and reduce the search frequency by pressing the button 810b formed as an inverted triangular mark.

The printer search screen (see FIG. 8D) shows an example of the contents of the device list 811 indicating the device information of the image forming apparatuses found by the search. As the device information of the image forming apparatus found by the search group, a model name, an IP address, calculated distance information, and an icon of a communication interface type are displayed on an apparatus-by-apparatus basis.

For example, on the topmost row of the device list 811, the device information of the image forming apparatus 104 is displayed. Specifically, there are displayed "C iR-3300-01" as the model name, "192.168.0.25" as the IP address, and "5.3 m" as the calculated distance information. Further, as the communication interface type icon, icons of UWB, BLE, and Wi-Fi are displayed.

Note that the printer search screen (see FIG. 8D) is only required to be configured such that a user can discriminate attributes necessary to select an image forming apparatus so as to input a print job (apparatus as a data transmission destination candidate) from the device list 811 and is not limited to the configuration shown in FIG. 8D. The user can set the attributes necessary to select an image forming apparatus to which a print job is to be sent, on a search condition-setting screen (see FIG. 8E: search condition UI) in advance.

Figure 8E:
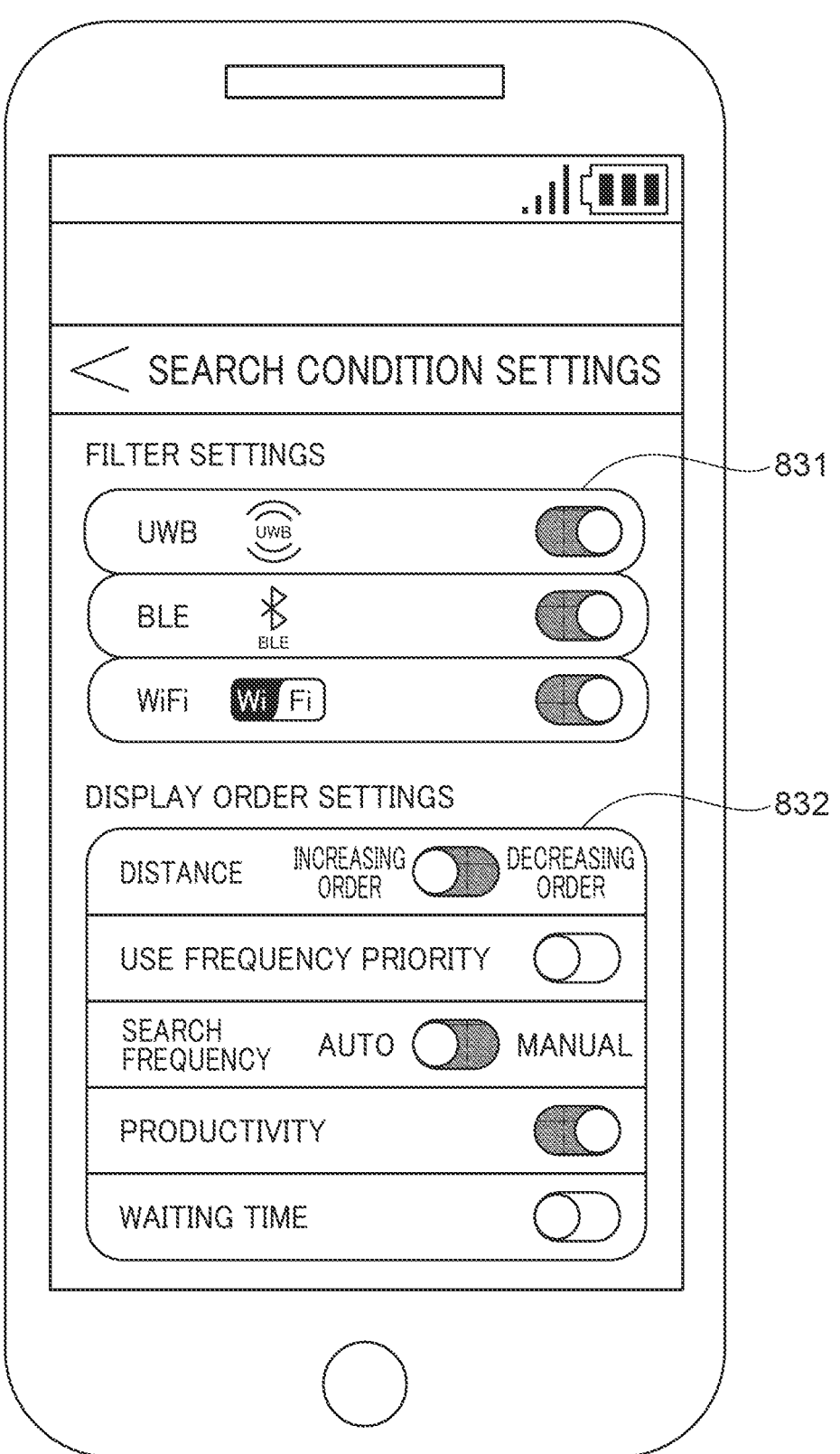
FIG. 8E is a diagram showing a search condition-setting screen of the mobile terminal.

As shown in FIG. 8E, on the search condition-setting screen, wireless communication standard selection items 831 and display order selection items 832 are arranged.

The wireless communication standard selection items 831 are displayed such that the user can select a wireless communication standard supported by an apparatus to be searched for as a condition of displaying a search result on the device list-displaying screen. With this, the user can narrow down the range of apparatuses to be searched for.

The display order selection items 832 are displayed such that the user can select settings associated with the display order of the search result. In the illustrated example, the display order selection items 832 include an item of distance on which the user can select a distance from a search target in an increasing order or in a decreasing order, an item of search frequency on which the user can select whether the search is to be performed automatically or manually, and so forth.

In a case where the item of search frequency is set to "automatic", the default search frequency is set, and the update button 812 and the buttons 810a and 810b are displayed in a state selectable by the user on the device list-displaying screen appearing in FIG. 8D. On the other hand, in a case where the item of search frequency is set to "manual", the buttons 810a and 810b cannot be selected by the user but the update button 812 is displayed in a state selectable by the user, on the device list-displaying screen.

The search condition-setting screen is shown in FIG. 8E by way of example and can be formed as a user interface which has other selection items and enables a user to narrow down the search result and arrange the display according to a user's intention.

Referring again to FIG. 7, next, in the mobile terminal 101, the CPU 202 receives user selection for setting one of the image forming apparatuses displayed on the device list 811 on the printer search screen (see FIG. 8D) as a search target apparatus (step S709). When user selection is received, the display is switched from the device list-displaying screen to the top menu screen (see FIG. 8F). On the top menu screen, the display is updated from the display having the button 301 (see FIG. 8A) indicating that a printer has not been selected yet to the display having a printer selection field 801a (see FIG. 8F) indicating the contents of the selected printer.

Referring again to FIG. 7, next, in the mobile terminal 101, the CPU 202 receives a print instruction from the user (step S710). For example, on the top menu screen (see FIG. 8F), when selection of the button 802 for selecting a photo as an original file to be set as the print instruction target is received, the CPU 202 switches the display to the print instruction screen in FIG. 8B. Then, the CPU 202 receives a print instruction from the user on the print instruction screen in FIG. 8B.

Figure 8F:
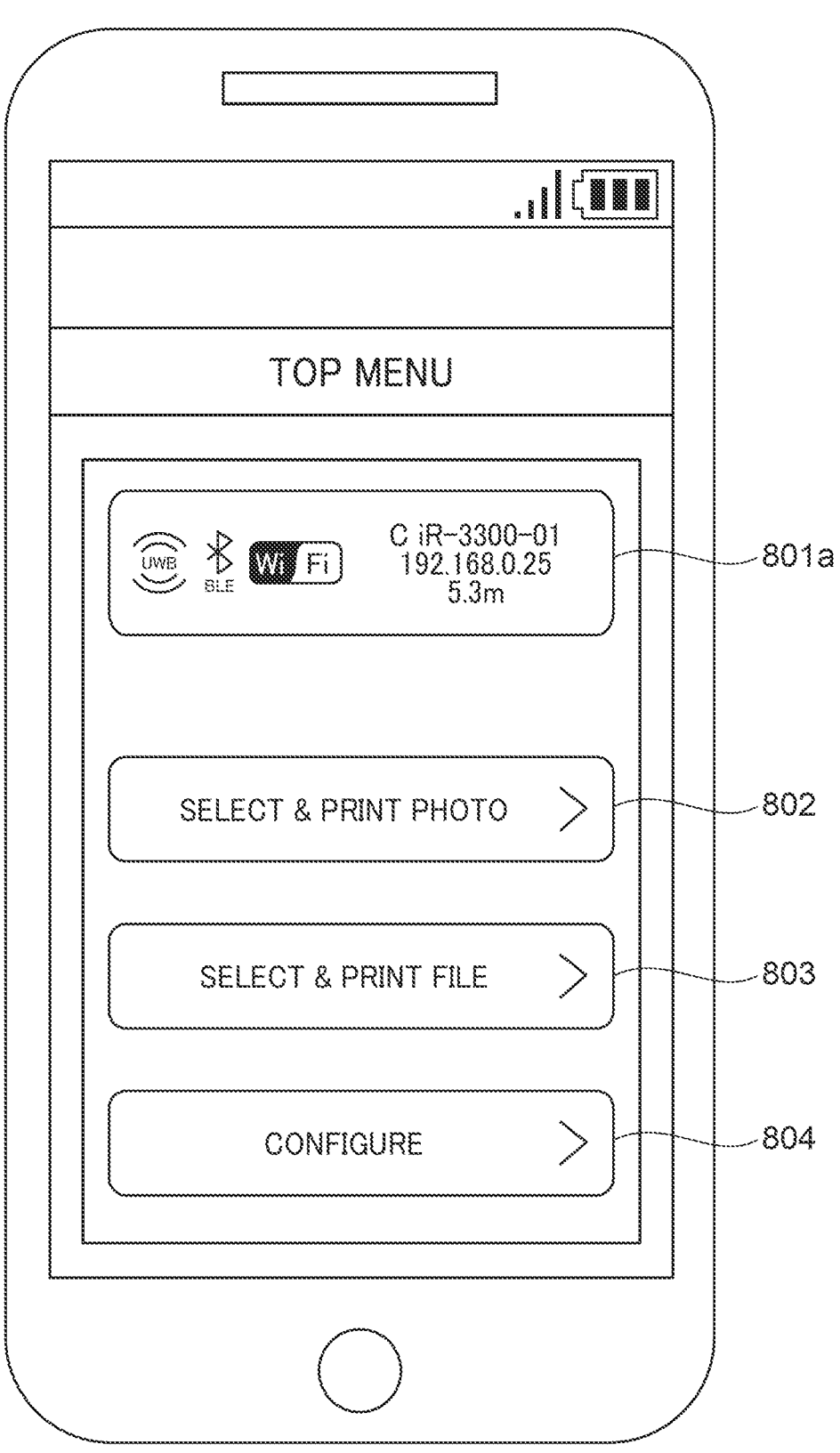
FIG. 8F is a diagram showing an example of the top menu screen of the mobile terminal.

Note that the user can also select the button 803 for selecting a file in a data format, such as WORD or PDF, as the file of an original to be set as the print instruction target on the top menu screen (see FIG. 8F).

The print instruction screen in FIG. 8B is a user interface for making print settings with respect to the file of an original (photo in this example) selected by the user and providing a print execution instruction. As shown in FIG. 8B, the print instruction screen has a preview section 840, a device information-displaying section 841, a print setting button 842, and a print button 843.

The preview section 840 displays a preview of the file of the original (photo in this example) selected by the user. The device information-displaying section 841 displays the device information of the image forming apparatus to which a print instruction is to be provided (image forming apparatus 104 in this example), which is selected on the printer search screen (see FIG. 8D). The print setting button 842 is a button for switching the display to a print setting screen, not shown, when pressed by the user, so as to receiving print settings. The user sets, for example, a sheet size, a color mode, a sheet feeding tray, and the number of copies, on this print setting screen, whereafter the display returns to the print instruction screen shown in FIG. 8B.

Referring again to FIG. 7, in the mobile terminal 101, when the CPU 202 receives an operation of pressing the print button 843 on the print instruction screen (see FIG. 8B), the CPU 202 generates a print job for printing the file of the original displayed on the preview section 840. Next, the CPU 202 transmits job data of the generated print job to the image forming apparatus to which a print instruction is provided (image forming apparatus 104 in this example), whose device information is displayed on the device information-displaying section 841 (step S711: operation of a transmission unit). Then, when the display is returned to the top menu screen (see FIG. 8A), the present process performed by the mobile terminal 101 is terminated. Note that the job data transmitted in the step S711 has information on the transmission destination (ranging target) of the ranging request to be transmitted in a step S714, described hereinafter, added thereto, for being transmitted to the image forming apparatus 104. Here, the information of the ranging target includes, for example, the UWB tag information of the ranging target and the setting contents (UWB authentication setting information) input by the user on the UWB authentication-setting screen (see FIG. 11).

Note that the method of adding the UWB tag information and so forth to the job data transmitted in the step S711 is not particularly limited. For example, the UWB tag information or the like can be added to the header part (not shown) of the job data itself transmitted in the step S711. Further, the UWB tag information or the like can be added to one of the fields of the packet used to transmit the job data.

Further, although in the present embodiment, the description has been given of the case where, as the information for identifying the ranging target, the information itself of the ranging target is added to the job data, this is not limitative insofar as it is possible to identify the ranging target in a step S712, described hereinafter. For example, in the process from the step S704 to the step S711, the mobile terminal 101 can transmit the login ID of the logged-in user as the information for identifying the ranging target (operations of the transmission unit and the acquisition unit). In this case, in the step S712, the ranging target is identified by acquiring, from a user account list (see FIG. 12), the identification information of the UWB tag, as the ranging target, which is associated with the acquired login ID.

By the information transmitted as described above, it is possible to transmit the information of the UWB tag as the ranging target, which is carried by the user, to the image forming apparatus 104. Note that here, although the description has been given of the case where the UWB tag as the ranging target of the image forming apparatus 104, which is carried by the user, is the mobile terminal 101, this is not limitative. For example, in a case where the user sets a desired UWB tag as the ranging target on the tag setting screen shown in FIG. 8C, the UWB tag information of the set UWB tag is added to the header part appearing in FIG. 12.

Note that transmission of job data in the step S711 is generally executed by handing over to higher frequency bands than, for example, Wi-Fi and ETHERNET.

According to above-described process, in the process for searching for an image forming apparatus, which is performed by the mobile terminal 101, identification of a counter apparatus and ranging are performed by using BLE communication and UWB communication, and candidates of apparatuses which can be selected are provided to the user using the results of the identification and ranging With this, the user can easily designate an apparatus to which the job data is to be transmitted and perform the transmission. Further, to the transmission destination apparatus, the UWB tag information for identifying the ranging target (the transmission source (mobile terminal 101) or another UWB tag set by the user) is also transmitted when the job data is transmitted. Therefore, distance measurement and positioning of the ranging target using UWB communication can be performed on the transmission destination apparatus.

Next, the operation of the image forming apparatus 104 which receives the job data transmitted from the mobile terminal 101 will be described.

The job data transmitted from the mobile terminal 101 is recorded in the print server 150 (see FIG. 3) or the print job management area 508 of the image forming apparatus 104. In the image forming apparatus 104, when the tag search section 503 receives the job data, the CPU 1201 acquires the UWB tag information and the UWB authentication setting information of the ranging target, which are added to the job data. After that, the CPU 1201 identifies the ranging target by consulting the UWB tag information (step S712: operation of an identification unit). In this step, the CPU 1201 performs mediation of the roles as the UWB devices and determines the image forming apparatus 104 as the anchor and the ranging target as the tag. Then, the CPU 1201 shifts to loop processing in a step S713 to start ranging between the image forming apparatus 104 and the ranging target (operations of a ranging start unit and a continuous execution unit). Note that although the ranging target is the mobile terminal 101 in the example shown in FIG. 7, the ranging target can be a UWB tag designated by the user, not shown in FIG. 7. Here, a case where the ranging target is the mobile terminal 101 will be described.

Note that the data processing system 1 is equipped with, as a feature thereof, a mechanism, on the application level, for changing the role as the execution entity of the access control based on ranging such that the image forming apparatus 104 is set as the anchor upon reception of the job data. With this mechanism, it is possible to release the user operating the mobile terminal 101 from gazing and operating on the screen of the mobile terminal 101 after transmitting the job data to the image forming apparatus 104 in the mobile print process.

Referring again to FIG. 7, in the image forming apparatus 104, the CPU 1201 transmits a ranging request packet to the ranging target (the mobile terminal 101 in this example) (step S714). This ranging request packet is for requesting ranging based on the UWB tag information of the ranging target identified by the tag search section 503 and is generated by the CPU 1201 calling the API of the UWB communication controller 506. Further, the ranging request packet is a ranging packet having a form necessary to perform the TWR ranging defined by IEEE 802.15.4, shown in FIG. 6, and is only required to include at least the ranging request identification information, the requesting source address information, and the request destination address information.

Next, upon receipt of the ranging request packet from the image forming apparatus 104, the CPU 202 of the mobile terminal 101 transmits a ranging response packet to the image forming apparatus 104 after the lapse of a predetermined time period (step S715). Upon receipt of the ranging response packet from the mobile terminal 101, the CPU 1201 of the image forming apparatus 104 performs ranging for calculating a distance between the image forming apparatus 104 and the mobile terminal 101 which is the ranging target, by the TWR ranging method shown in FIG. 6 (step S716). Distance information x obtained by ranging is updated as a variable in Rang_Value in the job management information list, shown in FIG. 13, which is managed in the print job management area 508.

Next, the CPU 1201 of the image forming apparatus 104 performs ranging determination for comparing the distance information x obtained by the ranging in the step S716 with a threshold value X (step S717). If it is determined by this ranging determination that x<X is true (a result of ranging determination first condition) indicates true), the CPU 1201 determines that the user has approached the image forming apparatus 104. In this case, the CPU 1201 of the image forming apparatus 104 performs login authentication of the user logged in the mobile terminal 101 (step S718). Note that the process from the ranging request in the step S714 to the ranging determination in the step S717 (i.e. the loop processing in the step S713 in FIG. 7) is repeatedly executed until x<X as the Break condition of the step S717 is satisfied. Here, the threshold value X can be a setting set in the authentication distance input field 823 on the authentication setting input screen (see FIG. 11) of the mobile terminal 101. Further, the threshold value X can be a setting made in an authentication distance input field 1111 on the UWB access control-setting screen 1110 (see FIG. 10C) of the image forming apparatus 104.

Note that the image forming apparatuses 104, 105, and 107, according to the present embodiment, can be set as an apparatus group having compatibility, that share the printer server 150. In this case, a user interface or a system for a reservation print function for enabling a user to select one of these apparatuses as a printer to execute the job data reserved in the print server 150 can be built. With this, the image forming apparatuses 104, 105, and 107 can simultaneously perform the ranging target identification (step S712), the ranging request (step S714), the ranging based on a ranging response (steps S715 and S716), and the ranging determination (step S717) in parallel, respectively.

Further, the image forming apparatus 104 has the UWB access control-setting screen 1110 (see FIG. 10C) on which the authentication distance input field 1111 and toggle buttons 1112 to 1114 for other settings are provided.

The authentication distance input field 1111 receives an input of the threshold value X for the ranging determination in the step S717. The toggle button 1112 is for selecting the priority of the threshold value X between the apparatuses, and by using this toggle, the user can select which one to use, between the threshold value X set on the image forming apparatus 104 and the threshold value X set on the mobile terminal 101.

The toggle buttons 1113 and 1114 are for selecting a combinational logic of the method of login authentication (UWB authentication) based on the ranging determination in the step S717 and the other login method. Specifically, the toggle button 1113 is for selecting a combinational logic of authentication using an IC card managed in the user account management area 509, and the UWB authentication. Further, the toggle button 1114 is for selecting a combinational logic of authentication using a keyboard input managed in the user account management area 509, and the UWB authentication. For example, as shown in FIG. 10C, in a case where AND is selected by using the toggle button 1113, when the login authentication is performed in the step S718, not only the UWB authentication, but also card reading of a predetermined IC card, performed by the image forming apparatus 104, is necessarily required. On the other hand, since OR is selected by the toggle button 1114 in FIG. 10C, besides the login authentication performed in the step S718, login authentication can be also performed based on an input of a user ID and a password on the keyboard (console section 140) of the image forming apparatus 104, performed by the user. Thus, the image forming apparatus 104 can flexibly cope with the needs and selection associated with the UWB ranging. Further, as an additional element, in a case where a result of the ranging determination in the step S717 becomes simultaneously true with respect to the job data transmitted from a plurality of users, a combination with the other login method can be used as an exclusive condition of the login authentication.

Figure 10D:
FIG. 10D is a diagram showing an example of the UWB access control-setting screen of the image forming apparatus.

Further, as shown in a UWB access control-setting screen 1120 in FIG. 10D, the image forming apparatus 104 has a user interface including toggle buttons 1121 to 1125 for receiving inputs for setting ranging start conditions and ranging termination conditions, by UWB communication.

The toggle button 1121 is a toggle for selecting whether or not to set reception of job data from the mobile terminal 101 which is the anchor, as a ranging start condition.

The toggle button 1122 is a toggle button for selecting whether or not to set reception of a notification by motion detection from the mobile terminal 101 which is the anchor, as a ranging start condition. Motion detection is detection of a specific motion of a user, performed by at least one sensor of the sensor group included in the mobile terminal 101, which consists of the GPS sensor 217, the gyro sensor 221, the acceleration sensor 222, and the touch panel (touch sensor) 216. Note that motion detection can be detection of a specific motion of a user, which is performed by a sensor installed as one of the other applications 408. The image forming apparatus 104 having received the notification by the motion detection predicts action of a user in advance by tracking a ranging target and can perform control to shift the electric mode of the self-apparatus to a power saving mode based on a result of the prediction.

Thus, the image forming apparatus 104 selectively receives the ranging start conditions from a plurality of combinations of conditions, from the user, by using the toggle buttons 1121 and 1122.

The toggle button 1123 is for selecting whether or not to set logout of the user as a ranging termination condition.

The toggle button 1124 is a toggle button for selecting whether or not to set a distance setting as a ranging termination condition, and the toggle button 1125 is for selecting whether or not to set motion detection as a ranging termination condition. In a case where the toggle button 1124 is set to on, thereby selecting the distance setting as a ranging termination condition, if the user moves away from the image forming apparatus 104 by a predetermined distance (second condition is satisfied), the user is automatically caused to log out, resulting in termination of the ranging.

Referring again to FIG. 7, next, if a result of the ranging determination in the step S717 indicates true, the CPU 1201 of the image forming apparatus 104 refers to the user account management area 509 and performs the authentication procedure (step S718). Note that in a case where the toggle button 1113 is set to AND and the toggle button 1114 is set to OR on the screen shown in FIG. 10C, the step S718 is not started until the user touches an IC card reader of the image forming apparatus 104 with a predetermined IC card. In the user account management area 509, as account information, a user account, such as a login ID and a password, and desired UWB tag information for authentication are stored in a state associated with each other as shown in FIG. 12 (user account list). The account information can be registered in the user account management area 509 by using a user interface on an operation screen, not shown, and associating these information items. In the authentication procedure in the step S718, first, the UWB tag information and the login ID, added to the job data transmitted in the step S711, are acquired. Next, account control is performed for checking the acquired UWB tag information and login ID against the UWB tag information and the login ID (User_name) which are managed in the user account management area 509. If these information items match as a result of the check, the login authentication (UWB authentication) is successfully performed.

Referring again to FIG. 7, next, the CPU 1201 of the image forming apparatus 104 confirms the job execution setting received by the toggle button 827 in the UWB authentication settings of the job data received in the step S711.

In a case where the confirmed job execution setting is a setting for automatically executing a reserved job when the UWB authentication is successfully performed (the toggle button 827 is set to on), after the login authentication is successfully performed in the step S718, the CPU 1201 directly proceeds to a step S720. In other words, the CPU 1201 skips a step S719. Then, in the step S720, the job of the job data received in the step S711 is executed. Note that in this case, if a plurality of job data associated with the authenticated user account have been received, all the received jobs are executed in the step S720.

On the other hand, if the confirmed job execution setting is set to "not automatically execute", the CPU 1201 performs the following operations:

In the image forming apparatus 104, if the confirmed job execution setting is set to "not automatically execute", after the login authentication is successfully performed in the step S718, the CPU 1201 displays the home screen 11 (see FIG. 10A) on the console section 140. On the home screen 11, there are arranged function selection buttons including COPY, FAX, and PRINT, and there are also displayed an authentication-in-progress icon 17 for indicating that authentication based on the UWB ranging is being performed and a UWB logo 19. When the user presses the function selection button of PRINT, the CPU 1201 proceeds to the step S719.

Note that although the sequence diagram shown in FIG. 7 is configured such that a ranging request and a ranging response are transmitted and received within the loop processing in the step S713, and the ranging operation is stopped if x<X holds (a result of the ranging determination indicates true), by way of example, this is not limitative. As another example, although not shown, the ranging operation can be continued even after x<X holds (a result of the ranging determination indicates true) and the login authentication is successfully performed. With this, for example, in a case where a result of the continued ranging satisfies a logout authentication condition, the logout processing can be automatically performed. Further, in this case, the display of the authentication-in-progress icon 17 can be linked with a result of the ranging determination based on the continued ranging operation. For example, if a result of the ranging determination indicates false, the CPU 1201 can change the display of the authentication-in-progress icon 17 to an icon indicating another message, such as "authentication end" or "not authenticated", or shift the display to an authentication request screen, not shown. With this, the user can recognize the authentication state based on the UWB ranging.

Referring again to FIG. 7, next, in the step S719, the CPU 1201 of the image forming apparatus 104 shifts the display from the home screen 11 to a print job selection screen 1100 (see FIG. 10B) for receiving an input of selection of the job data associated with the authenticated user account. Then, the CPU 1201 receives job selection from the user on the print job selection screen 1100 (in FIG. 10B) (step S719).

An example of the print job selection screen 1100 shown in FIG. 10B displays two job data items in a state selectable by the user, and details of each job is visualized in a state recognizable by the user. The information of each of the two job data items displayed on the print job selection screen 1100 is job information temporarily stored, for example, in the print server 150, which can also be referred to from the image forming apparatuses 105 to 107 which are connected to the network 103. Hereafter, a case where the user has selected a job 1101 (see FIG. 10B) of the two job data items displayed on the print job selection screen 1100 in the step S719 will be described.

As shown in FIG. 10B, buttons 1102 to 1106 are further arranged on the print job selection screen 1100.

The button 1102 is for receiving a print execution instruction for the job 1101. If the button 1102 is pressed, the CPU 1201 proceeds to the step S720 to execute printing of the job 1101.

The button 1103 is a button for receiving an instruction for temporarily stopping the operation of printing the job 1101 during the operation of printing the job 1101.

The button 1106 is for shifting the display to an input screen for receiving confirmation or a change of the job settings of the job 1101. Further, the button 1105 is for displaying a preview of a print image to be printed by the job 1101, and the button 1104 is for stopping temporal storage of the job 1101 in the print server 150 or the like and deleting the job 1101.

Referring again to FIG. 7, next, when the button 1102 is pressed in a state in which the job 1101 has been selected on the print job selection screen 1100 shown in FIG. 10B in the step S719, the CPU 1201 of the image forming apparatus 104 executes printing of the job 1101 (step S720).

Note that, as described above, if the job execution setting in the UWB authentication settings of the job data is set to "automatically execute", after the login authentication is successfully performed in the step S718, the CPU 1201 skips the step S719 and proceeds to the step S720. That is, in this case, the print job selection screen 1100 (see FIG. 10B) displayed in the step S719 is not displayed on the image forming apparatus 104. Therefore, in this case, in the step S720, the CPU 1201 executes printing of the job data (if the plurality of job data items have been received in the step S711, all of the job data items) received in the step S711.

Thus, the description has been given of the operation sequence from the step of searching performed by the mobile terminal 101 for an image forming apparatus as the print output destination to the step of printing executed by the image forming apparatus found by the search.

As described above, in the present embodiment, in the data processing system 1, a print job received from the mobile terminal 101 includes UWB tag information of a ranging target for the image forming apparatus 104. Therefore, the image forming apparatus 104 starts the access control based on the UWB tag information included in the print job, by operating as the execution entity of measuring a distance between the self-apparatus and the ranging target. Further, the image forming apparatus 104 stores the user account management area 509, associated with the login ID and password of the user and the desired UWB tag information for authentication. Therefore, the user can cause the image forming apparatus 104 to perform user authentication only by moving toward the image forming apparatus 104 in a state carrying the mobile terminal 101 (or any other UWB tag set by the user). That is, it is possible to perform access control in the data processing system 1 without prompting the user to gaze or operate on the screen of the mobile terminal 101 in a process in which the user having the mobile terminal 101 moves toward the image forming apparatus 104.

Next, a second embodiment of the present invention will be described.

Figure 14:
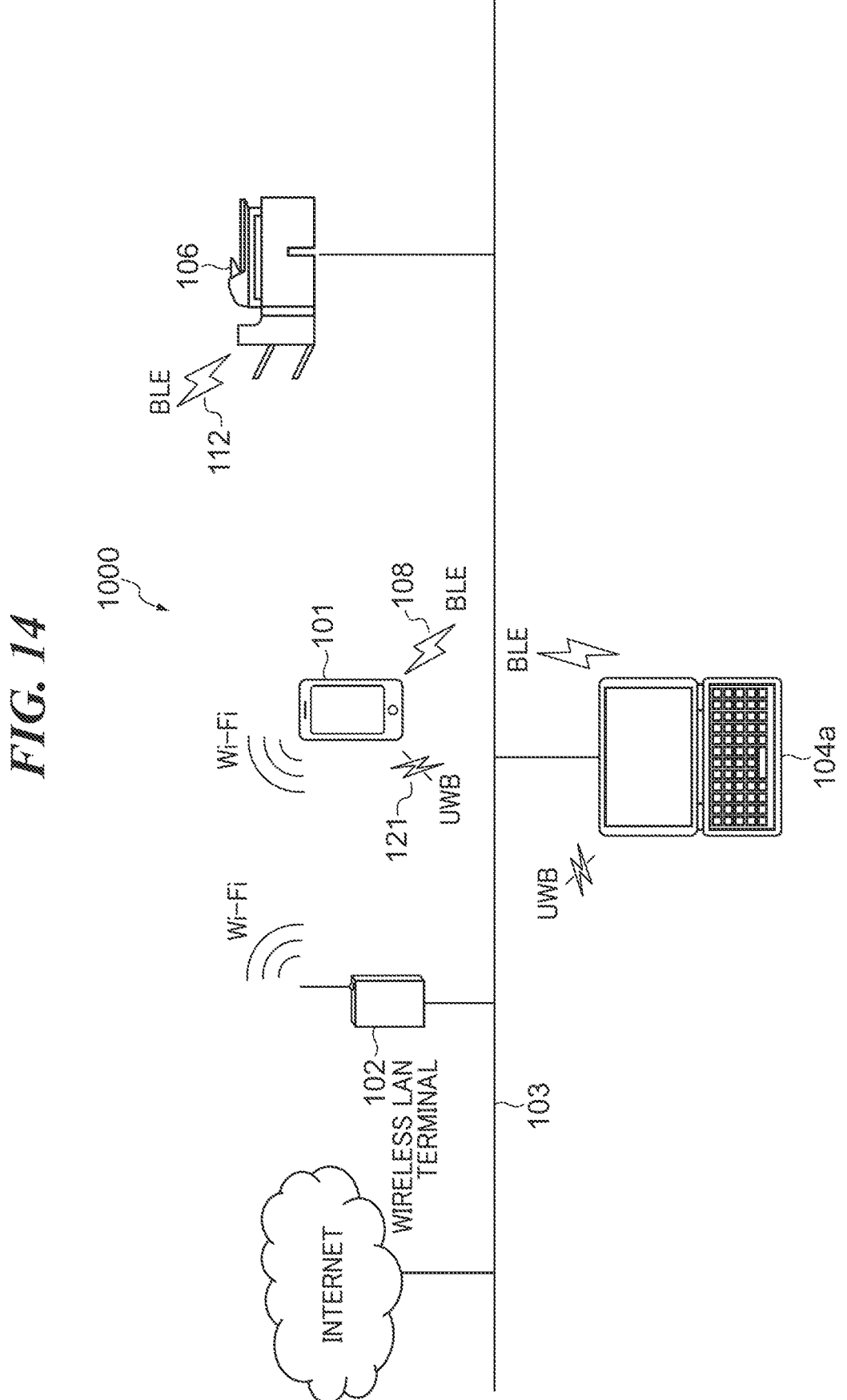
FIG. 14 is a diagram showing a configuration of a data processing system according to a second embodiment of the present invention.
Figure 15:
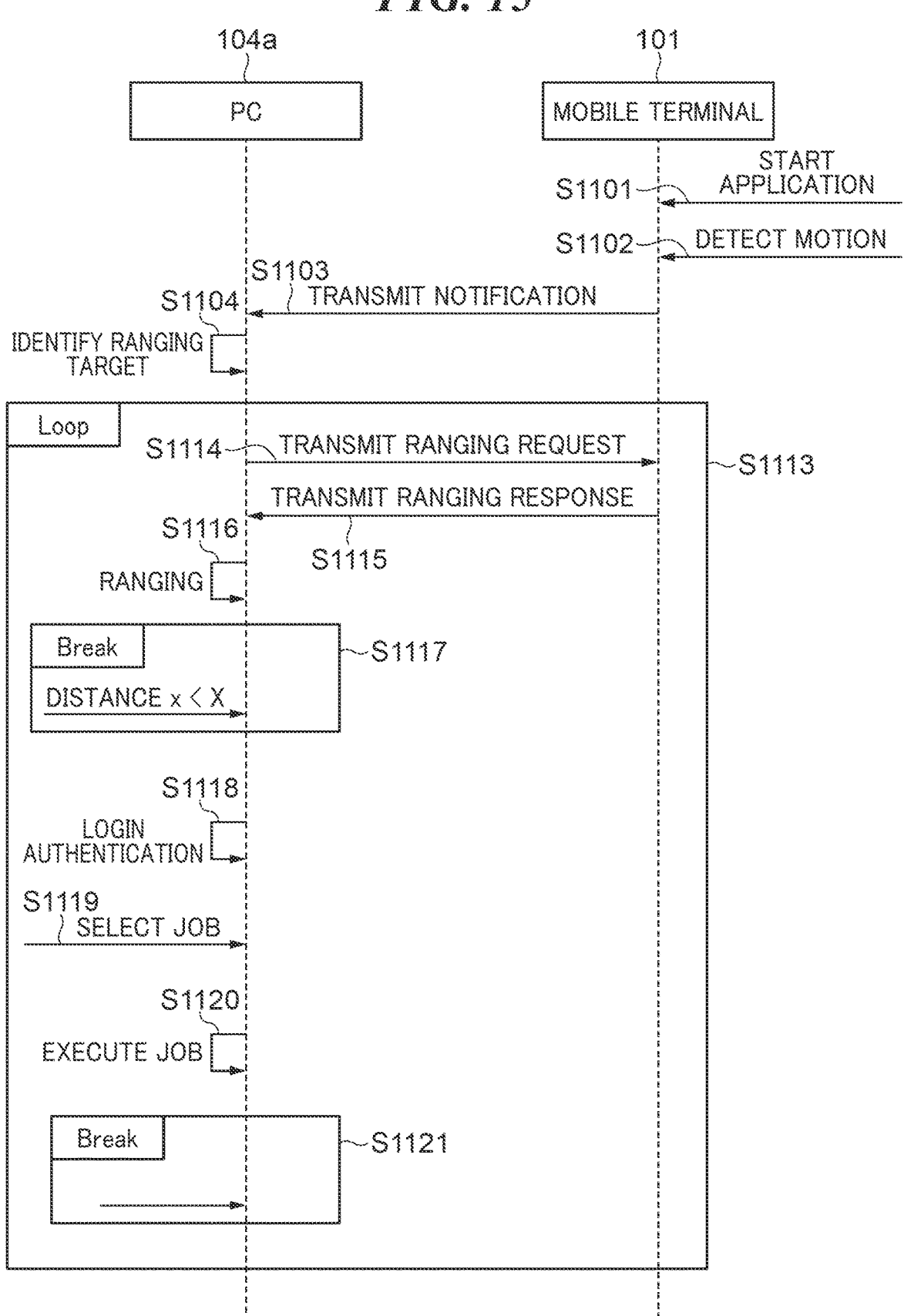
FIG. 15 is a sequence diagram showing the whole operation process performed in the data processing system according to the second embodiment.

FIG. 14 is a diagram showing a data processing system 1000 according to a second embodiment of the present invention. FIG. 15 is a sequence diagram showing the whole operation process performed in the data processing system 1000. The second embodiment differs from the first embodiment in that a PC 104a (information processing apparatus) as a general personal computer exists in place of the image forming apparatuses 104, 105, and 107 in the data processing system 1000. That is, differently from the image forming apparatuses 104, 105, and 107, the PC 104a include none of the printer section 20 and the scanner section 10, and the hardware resources and the software resources necessary for controlling the printer section 20 and the scanner section 10.

Note that the information processing apparatus according to the present embodiment is not limited to the PC 104a insofar as it is an apparatus that executes information processing by performing BLE communication and UWB communication in cooperation with the mobile terminal 101. For example, the information processing apparatus can be home electric appliances that can perform communication and information processing in cooperation with the mobile terminal 101.

Further, the present embodiment is characterized in that when a notification is provided from the mobile terminal 101 to the PC 104a based on motion detection performed by the sensor group included in the mobile terminal 101, the access control based on ranging is performed by the PC 104a. Here, "execution of a job" in the present invention is not limited to execution of a job specific to unique functions of each of the image forming apparatus 104 and the PC 104a as the information processing apparatus. For example, the execution of a job in the first embodiment refers to printing of a print job, which is performed by the image forming apparatus 104. In contrast, the execution of a job in the second embodiment refers to switch control of an air conditioning device and a lighting device, performed by the PC 104a. Further, the execution of a job in the second embodiment can be control for locking or unlocking a room entry/exit gate or the door of a room, performed by the PC 104a. That is, the execution of a job in the present invention is only required to cause an information processing apparatus to execute the control for achieving a user's final goal.

The data processing system 1 of the present invention is characterized in that the information processing apparatus operates as the execution entity and makes it possible to perform the access control by performing ranging control based on information notified from the moving mobile terminal side.

Although the operation sequence of the present embodiment will be described below with reference to FIG. 15, the redundant description is omitted and different part from the first embodiment will be described.

First, when the mobile terminal 101 receives a predetermined operation from the user, the CPU 202 starts an application installed in the mobile terminal 101, for a specific use, (step S1101).

Note that the application started in the step S1101 is not limited to the application for the specific use. For example, utility software resident in the OS of the mobile terminal 101, which is executed in the background, can be used.

Next, the CPU 202 detects a specific motion (performs motion detection) of the user by using at least one of the sensors included in the mobile terminal 101 (step S1102). Note that in the step S1102, in place of motion detection, for example, a predetermined operation on the touch panel 216, performed by a user, can be detected.

The CPU 202 notifies the PC 104a of a result of the motion detection in the step S1102 (step S1103). Note that as described above, the CPU 202 can detect a predetermined operation on the touch panel 216 in the step S1102 and notify the PC 104a of a result of the detection in the step S1103. To the result of the motion detection, notified to the PC 104a in the step S1103, information of a transmission destination (ranging target) of a ranging request transmitted in a step S1114, described hereinafter, is added. Here, the information of the ranging target includes, for example, the UWB tag information of the ranging target and settings (UWB authentication setting information) input by the user on the USB authentication-setting screen (see FIG. 11).

As shown in FIG. 15, the steps from the search performed by using BLE communication (step S702) to the GATT communication (step S705) in the first embodiment can be omitted. Specifically, in the present embodiment, information has been exchanged and recorded between the mobile terminal 101 and a plurality of communication partners in advance, and the user has determined the PC 104a as the notification destination in the step S1103 based on the information exchanged and recorded in advance before executing the sequence in FIG. 15.

Further, the steps from transmission of the ranging request (step S1114) to execution of the job (step S1120) are basically the same as the steps S714 to S720 in FIG. 7, described in the first embodiment. However, the unit of the loop processing (step S1113) in the present embodiment differs from the loop processing (step S713) of the first embodiment, and the steps S1114 to S1120 are repeated as the unit of the loop processing. That is, the ranging process is continued up to execution of the job (step S1120), and in a step S1121, the loop processing (step S1113) is terminated. In the step S1121, on the UWB access control-setting screen 1120 (see FIG. 10D), the setting contents (settings by the toggle buttons 1123 to 1125 in FIG. 10D) received as the ranging termination conditions are applied. Thus, results of the ranging obtained by UWB communication can be flexibly used according to needs.

Note that in the present embodiment, the present invention can also be realized by supplying a program that realizes one or more functions to a system or a computer of an apparatus via a network or a storage medium, and the system or a system controller of the apparatus performing a process for loading the program and executing the loaded program. The system controller has one or a plurality of processors or circuits and can include a network of a plurality of separated system controllers or a plurality of separated processors or circuits to read and execute an executable command.

The processor or circuit can include a central processing unit (CPU), a micro processing unit (MPU), a graphics processing unit (GPU), an application-specific integrated circuit (ASIC), and a field programmable gate array (FPGA). Further, the processor or circuit can include a digital signal processor (DSP), a data flow processor (DFP), or a neural processing unit (NPU).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-037286 filed Mar. 10, 2023, which is hereby incorporated by reference herein in its entirety.

What is claimed is:

1. A data processing system including a mobile communication device and an information processing apparatus that can communicate with each other by first wireless communication and second wireless communication, comprising:

an exchange unit configured to exchange communication setting information for use in the second wireless communication between the mobile communication device and the information processing apparatus by the first wireless communication;

a ranging unit configured to transmit, as an execution entity of ranging in a bidirectional ranging method of the second wireless communication, ranging request data from the information processing apparatus to a ranging target that performs the second wireless communication, and receive, at the information processing apparatus, ranging response data associated with the ranging request data from the ranging target, to thereby measure a distance between the ranging target and the information processing apparatus;

a transmission unit configured to transmit data to which information of the ranging target is added as the information for identifying the ranging target from the mobile communication device to the information processing apparatus by the second wireless communication based on the communication setting information exchanged by the exchange unit;

an identification unit configured to identify the ranging target at the information processing apparatus based on the information for identifying the ranging target;

a ranging start unit configured to start, when the ranging target is identified by the identification unit, ranging by the ranging unit, and transmit the ranging request data to the ranging target identified by the identification unit; and a continuous execution unit configured to continue execution of the ranging started by the ranging start unit until a distance measured by the ranging unit satisfies a first condition, wherein in a case where the distance measured by the ranging unit satisfies the first condition, and the continuous execution of the ranging is terminated, account control on a user having logged in the mobile communication device is performed for the information processing apparatus, wherein after the account control is performed, the information processing apparatus executes a predetermined job, and wherein the mobile communication device includes:

a search unit configured to search for the information processing apparatus as a data transmission destination candidate by receiving a beacon transmitted from outside by the first wireless communication; and a search condition user interface for receiving a wireless communication standard supported by the information processing apparatus as the data transmission destination candidate, from a user, to set the received wireless communication standard as the search condition.

2. The data processing system according to claim 1, wherein the first wireless communication is BLE (Bluetooth Low Energy).

3. The data processing system according to claim 1, wherein the second wireless communication is UWB (Ultra Wide Band) based on the IEEE 802.15.4z standard.

4. The data processing system according to claim 3, wherein the communication setting information is information for identifying a UWB tag based on the IEEE 802.15.4z standard and at least includes information of a role of the UWB, information of a ranging method, and address information of a packet transmission destination.

5. The data processing system according to claim 1, wherein the bidirectional ranging method is TWR (Two Way Ranging) based on the IEEE 802.15.4z standard.

6. The data processing system according to claim 1, further comprising another user interface for selectively receiving at least one condition for causing the ranging start unit to start ranging, by a user operation from a plurality of combinations of conditions, wherein the plurality of conditions include a type of the data to which the information of the ranging target is added.

7. The data processing system according to claim 6, wherein the information processing apparatus is an image forming apparatus that executes a print job, and wherein the type of data to which the information of the ranging target is added is job data of the print job, and the predetermined job is the print job reserved until the account control is terminated.

8. The data processing system according to claim 6, wherein the mobile communication device includes a sensor for detecting a specific motion of the user, and wherein the type of data to which the information of the ranging target is added is data including a notification indicating that the sensor has detected the specific motion of the user.

9. The data processing system according to claim 8, wherein the sensor is at least one of a GPS sensor, a gyro sensor, an acceleration sensor, and a touch sensor.

10. The data processing system according to claim 1, wherein the mobile communication device includes a ranging authentication user interface for receiving user selection as to whether or not to perform the account control on the user for the information processing apparatus in a case where the first condition is satisfied.

11. The data processing system according to claim 1, wherein the account control on the user is login authentication based on a user account registered in the information processing apparatus in association with information of the ranging target identified by the identification unit.

12. The data processing system according to claim 1, further comprising another user interface for selectively receiving at least one ranging termination condition for terminating the continuous execution of the ranging, by a user operation from a plurality of combinations of conditions, wherein one of the conditions is logout from the information processing apparatus.

13. The data processing system according to claim 12, wherein the logout from the information processing apparatus is executed in a case where the distance measured by the ranging unit satisfies a second condition while the continuous execution of the ranging is being performed.

14. The data processing system according to claim 1, further comprising another user interface for receiving the first condition at at least one of the information processing apparatus and the mobile communication device.

15. An information processing apparatus that is capable of communicating with a mobile communication device by first wireless communication and second wireless communication, comprising:

an exchange unit configured to exchange communication setting information for use in the second wireless communication with the mobile communication device, by the first wireless communication;

a ranging unit configured to transmit, as an execution entity of ranging in a bidirectional ranging method of the second wireless communication, ranging request data to a ranging target that performs the second wireless communication, and receive ranging response data associated with the ranging request data from the ranging target, to thereby measure a distance between the ranging target and the information processing apparatus;

an acquisition unit configured to acquire data to which information of the ranging target is added as the information for identifying the ranging target from the mobile communication device by the second wireless communication based on the communication setting information exchanged by the exchange unit;

an identification unit configured to identify the ranging target based on the information for identifying the ranging target;

a ranging start unit configured to start, when the ranging target is identified by the identification unit, the ranging by the ranging unit, and transmit the ranging request data to the ranging target identified by the identification unit; and a continuous execution unit configured to continue execution of the ranging started by the ranging start unit until a distance measured by the ranging unit satisfies a first condition, wherein in a case where the distance measured by the ranging unit satisfies the first condition, and the continuous execution of the ranging is terminated, account control on a user is performed for the information processing apparatus, wherein after the account control is performed, the information processing apparatus executes a predetermined job, and wherein the mobile communication device includes:

a search unit configured to search for the information processing apparatus as a data transmission destination candidate by receiving a beacon transmitted from outside by the first wireless communication; and a search condition user interface for receiving a wireless communication standard supported by the information processing apparatus as the data transmission destination candidate, from a user, to set the received wireless communication standard as the search condition.

16. The information processing apparatus according to claim 15, wherein the information for identifying the ranging target is a login ID of a user having logged in the mobile communication device, and wherein the identification unit acquires information of the ranging target registered in the information processing apparatus in association with the login ID.

17. A method of controlling an information processing apparatus that is capable of communicating with a mobile communication device by first wireless communication and second wireless communication, comprising:

exchanging communication setting information for use in the second wireless communication, with the mobile communication device by the first wireless communication;

transmitting, as an execution entity of ranging in a bidirectional ranging method of the second wireless communication, ranging request data to a ranging target that performs the second wireless communication, and receiving ranging response data associated with the ranging request data from the ranging target, to thereby measure a distance between the ranging target and the information processing apparatus;

acquiring data to which information of the ranging target is added as the information for identifying the ranging target from the mobile communication device by the second wireless communication based on the communication setting information exchanged by said exchanging;

identifying the ranging target based on the information for identifying the ranging target;

starting, when the ranging target is identified by said identifying, the ranging, and transmitting the ranging request data to the ranging target identified by said identifying;

continuing execution of the ranging started by said starting until the measured satisfies a first condition; and performing, in a case where the measured distance satisfies the first condition, and the continuous execution of the ranging is terminated, account control on a user for the information processing apparatus, wherein after the account control is performed, the information processing apparatus executes a predetermined job, and wherein the mobile communication device searches for the information processing apparatus as a data transmission destination candidate by receiving a beacon transmitted from outside by the first wireless communication, and receives a wireless communication standard supported by the information processing apparatus as the data transmission destination candidate, from a user, to set the received wireless communication standard as the search condition.

\* \* \* \* \*